US012799285B2

(12) United States Patent
Esseghir et al.

(10) Patent No.: US 12,799,285 B2
(45) **Date of Patent: *Nov. 17, 2026**

(54) CROSSLINKABLE POLYETHYLENE COMPOUNDS AND METHODS FOR MAKING THEM

(71) Applicant: Dow Global Technologies LLC, Midland, MI (US)

(72) Inventors: Mohamed Esseghir, Lawrenceville, NJ (US); Neil W. Dunchus, Kinnelon, NJ (US); Qian Gou, Collegeville, PA (US); Saurav S. Sengupta, Gilbertsville, PA (US); Jeffrey M. Cogen, Flemington, NJ (US)

(73) Assignee: Dow Global Technologies LLC, Midland, MI (US)

( * ) Notice: Subject to any disclaimer, the term of this patent is extended or adjusted under 35 U.S.C. 154(b) by 415 days.

This patent is subject to a terminal disclaimer.

(21) Appl. No.: 18/555,954

(22) PCT Filed: Jul. 6, 2022

(86) PCT No.: PCT/US2022/036211

§ 371 (c)(1),
(2) Date: Oct. 18, 2023

(87) PCT Pub. No.: WO2023/287619

PCT Pub. Date: Jan. 19, 2023

(65) Prior Publication Data

US 2024/0376275 A1 Nov. 14, 2024

Related U.S. Application Data

(60) Provisional application No. 63/222,000, filed on Jul. 15, 2021.

(51) Int. Cl.

| | |
|---|---|
| ***C08J 3/12*** | (2006.01) |
| ***C08J 3/20*** | (2006.01) |
| ***C08J 3/205*** | (2006.01) |
| ***C08J 3/24*** | (2006.01) |
| ***C08K 5/00*** | (2006.01) |
| ***C08K 5/14*** | (2006.01) |

(52) U.S. Cl.

CPC ................. *C08J 3/201* (2013.01); *C08J 3/12* (2013.01); *C08J 3/203* (2013.01); *C08J 3/2056* (2013.01); *C08J 3/24* (2013.01); *C08K 5/0025* (2013.01); *C08K 5/005* (2013.01); *C08K 5/14* (2013.01); *C08J 2323/04* (2013.01)

(58) Field of Classification Search

CPC ..... C08J 3/201; C08J 3/12; C08J 3/203; C08J 3/2056; C08J 3/24; C08J 2323/04; C08J 2323/06; C08J 2323/12; C08K 5/0025; C08K 5/005; C08K 5/14; B29C 48/154; H01B 7/00; H01B 13/24

USPC ........................................................ 523/348

See application file for complete search history.

(56) References Cited

U.S. PATENT DOCUMENTS

| | | | | |
|---|---|---|---|---|
| 3,335,124 | A | 8/1967 | Larsen | |
| 5,245,084 | A | 9/1993 | Groepper et al. | |
| 5,292,791 | A | 3/1994 | Groepper et al. | |
| 5,649,052 | A | 7/1997 | Kim | |
| 9,957,405 | B2 | 5/2018 | Sun et al. | |
| 10,941,278 | B2 | 3/2021 | Cai et al. | |
| 2020/0003513 | A1 | 1/2020 | Aral | |
| 2020/0199270 | A1 | 6/2020 | Zhang et al. | |
| 2021/0000791 | A1 | 1/2021 | Levy | |
| 2025/0214294 | A1 * | 7/2025 | Esseghir | B29B 7/88 |

FOREIGN PATENT DOCUMENTS

| | | |
|---|---|---|
| CN | 101747553 | 6/2010 |
| CN | 109370003 | 2/2019 |
| EP | 0952180 | 10/1999 |
| EP | 1249845 | 10/2002 |
| EP | 3192633 | 7/2017 |
| GB | 1386616 | 3/1975 |
| GB | 1535038 | 12/1978 |
| GB | 1535039 | 12/1978 |
| GB | 1535040 | 12/1978 |
| JP | 59215347 | 12/1984 |
| WO | 2013112781 | 8/2013 |
| WO | 2019000311 | 1/2019 |
| WO | 2019000654 | 1/2019 |

OTHER PUBLICATIONS

Search Report and Written Opinion from corresponding International Application No. PCT/US2022/036211 dated Oct. 21, 2022.

Search Report from corresponding Taiwan Application No. 111126406 dated Nov. 21, 2025.

International Preliminary Report on Patentability from corresponding International Application No. PCT/US2022/036211 dated Jan. 16, 2024.

* cited by examiner

*Primary Examiner* — Hannah J Pak

(57) ABSTRACT

Provided are high temperature, low scorch, including no scorch, which is defined herein, methods of making crosslinkable compound compositions, the method comprising melt compounding a primary stream at a temperature of from 120.0° to 150.0° C., wherein the primary stream comprises one or more thermoplastic polyolefins and one or more antioxidants, but lacks curative additives selected from the group consisting of: peroxides and crosslinking coagents; and injecting into the compounded melt a combination of curative additives comprising one or more organic peroxides and one or more crosslinking coagents, and homogeneously mixing the one or more thermoplastic polyolefins, one or more antioxidants, one or more organic peroxides, and one or more crosslinking coagents by melt compounding them together. Also provided are methods of making crosslinked compound compositions and manufactured articles.

14 Claims, 1 Drawing Sheet

CROSSLINKABLE POLYETHYLENE COMPOUNDS AND METHODS FOR MAKING THEM

The technical field relates to methods of making crosslinkable compound compositions comprising a thermoplastic polyolefin and additives and to the compositions made thereby.

INTRODUCTION

A thermoplastic polyolefin (TPO), such as a thermoplastic polyethylene (TPE), is a polymeric hydrocarbon that melts and flows at a "high temperature", here broadly meaning a temperature from 110° to 190° C., depending on the particular TPO. Crosslinkable compound compositions comprise the TPO and additives, such as antioxidants, fillers, colorants, and curatives, which are compounds that initiate free-radical crosslinking or increase concentration of crosslinks made thereby (sometimes called crosslink density). The feature of being "crosslinkable" may be determined by compression molding a sample of the crosslinkable compound composition into a plaque and measuring maximum torque (MH). We define a "crosslinkable" compound composition as that having a maximum torque (MH) at 182° C. of at least 2.09 dN-m (1.85 lbf-in), preferably at least 2.26 dN-m (2.0 lbf-in), as determined by moving die rheometer (MDR) testing in accordance with ASTM procedure D5289.

Scorch is premature crosslinking of the TPO during preliminary melt processing of the TPO with additives to make the crosslinkable compound composition. The composition's susceptibility to scorch in may be detected and measured by compression molding a sample of the crosslinkable compound composition into a plaque and measuring time to onset of scorch. We define "low scorch" as a scorch time (ts1) at 140° C. of at least 50 minutes, alternatively at least 60 minutes, preferably at least 65 minutes, reported as the time required for increase of 1 unit (inch-lb) or 1.13 deciNewton-meter (dN-m) from minimum torque ("ML"), as determined by moving die rheometer (MDR) testing in accordance with ASTM procedure D5289. We define "no scorch" as having a scorch time (ts1) at 140° C. of greater than 150 minutes, wherein the scorch times (ts1) at 140° C. is measured as described herein.

Scorch is an industry problem. It ultimately creates defects in manufactured articles. Defects may include cracking, gels, or voids and can lead to mechanical failure of the manufactured article. For example, when the crosslinkable compound composition used to make an insulation layer covering a conductive core in an electrical power cable, such as a medium voltage (MV), high voltage (HV), or extra-high voltage (EHV) power cable, suffers scorch during preliminary melt processing, the insulation layer may end up with tiny cracks, voids, or gels. This can cause premature failure of the power cable.

Therefore, to prevent or minimize defects caused by scorch during preliminary melt processing of TPO with additives, the method used in the art to make the crosslinkable compound composition comprises (a) melt compounding a melt of the TPO with additives such as antioxidants, fillers, and colorants, but not curative additives, to make an intermediate melt that is free of curative additives; (b) pelletizing the intermediate melt; (c) soaking the pellets with the curative additives (e.g., an organic peroxide and crosslinking coagent) at a temperature from 50° to 90° C. for 1 to 24 hours (i.e., below the melting temperature of the TPO and below the decomposition temperature of the organic peroxide) to give the crosslinkable compound composition as pellets; (d) melting the crosslinkable compound composition; (e) extruding and shaping the melt into a manufactured article; and (f) curing the extruded and shaped article.

Known methods for making electrical cable insulation comprise melt compounding a polyolefin base resin to incorporate additives, such as antioxidants to make a compounded material, filtering the compounded material, and then pelletizing to make an intermediate pellet compound without free radical initiators (also called crosslinking initiators), followed by impregnating or soaking, in a "soaking" tower, the free radical initiators with the intermediate compound pellets to incorporate the free radical initiators thereinto and make a cable insulation making compound. The methods require at least a compounder and a soaking tower; and the cable insulation making compound comprises a crosslinkable compound (may also be called a thermoplastic, crosslinkable compound) in the form of pellets that a downstream cable manufacturer crosslinks when making the cable itself. Thus, bringing the intermediate granules or pellets thereof to a proper temperature (e.g., 70° C. or so), and then incorporation of free radical initiators comprises soaking to physically mix them with intermediate pellets; the resulting fully formulated granules or pellets are soaked at the proper temperature at which the free radical initiators will diffuse into the granules or pellets over a time of several hours until the surfaces of the pellets are dry. Additional soaking may be needed in the packaging bin to reach uniform distribution of the free radical initiators in the pellets. Soaking towers comprise very massive and expensive equipment, thereby limiting the feasibility of developing multiple compounding sites or plants for making cable insulation making compound. Therefore, there remains a need to enable the compounding of all materials in a cable insulation making compound, for example, making crosslinkable pellets thereof, without the use of or the need for a soaking tower. The fully formulated compound pellets need to be cooled down before conveying them; therefore, a heating bin (optional) and a cooling device (required), such as a fluid bed or cooling bin, are necessary for the prior method.

Conventional polyolefin compounding lines for cable insulation making compounds do not enable incorporation of free radical initiators in the base resin. Rather, the free radical initiators are incorporated by soaking the base resin, for example, in soaking tower facilities, in prolonged processing and handling that results in a high cost process. In addition, the large amounts of material in facilities can lead to a high risk of external contamination and the need to have many clean rooms and associated staff to process the materials. This is to say nothing of energy consumption in the added processing, which leads to a large carbon footprint.

Still further, injecting free radical initiators into a polymer melt in a conventional compounding process remains very challenging because the free radical initiators decompose and react under the conditions and time required to compound base resin and antioxidant (AO) additives. In making a suitable cable insulation making compound, the specific energy input (SEI) required to melt and mix the polyolefin base resin and antioxidant (AO) additives to adequately distribute the AO additives, and more importantly to achieve an acceptably high production rate, usually results in excessive melt temperature of the intermediate compound, for example, at or above 180° C. At such temperatures, decomposition of the free radical initiators results, thereby creating an undesired chemical crosslinking reaction and an unusable product.

Recent U.S. patent publication no. 2020/0199270A1 to Zhang et al. discloses a composition comprising a polyolefin polymer, an alkenyl-functional monocyclic organosiloxane, and an organic peroxide. The compositions find use as wire and cable coatings, which act as insulation. While Zhang et al. generically reference mixing all of the materials in the composition, the only method disclosed for incorporating the peroxide into the composition comprises soaking.

SUMMARY

In accordance with embodiments the present invention, the present inventors have solved the problem of providing stable, crosslinkable compound compositions for use as a cable insulation making compound without the need for a soaking step to incorporate a crosslinking initiator into the composition. Embodiments of the present invention relate to methods of making, particularly to high temperature, low scorch, including no scorch, which is defined herein as a scorch time (ts1) at 140° C. of greater than 150 minutes, wherein the scorch times (ts1) at 140° C. is measured as described herein, methods of making crosslinkable compound compositions comprising a thermoplastic polyolefin and additives. Also included are methods of making crosslinked compositions and manufactured articles from the crosslinkable compound compositions.

Provided are high temperature, low scorch, including no scorch, which is defined herein as a scorch time (ts1) at 140° C. of greater than 150 minutes, wherein the scorch times (ts1) at 140° C. is measured as described herein, methods of making crosslinkable compound compositions, the method comprising melt compounding a primary stream at a temperature of from 120.0° to 150.0° C., alternatively from 125° to 149° C., wherein the primary stream comprises one or more thermoplastic polyolefins and one or more antioxidants, but lacks curative additives selected from the group consisting of: peroxides and crosslinking coagents; and injecting into the compounded melt a combination of curative additives comprising one or more organic peroxides and one or more crosslinking coagents, and homogeneously mixing the one or more thermoplastic polyolefins, one or more antioxidants, one or more organic peroxides, and one or more crosslinking coagents by melt compounding them together. Also provided are methods of making crosslinked compound compositions and manufactured articles.

DETAILED DESCRIPTION

Figure 1:
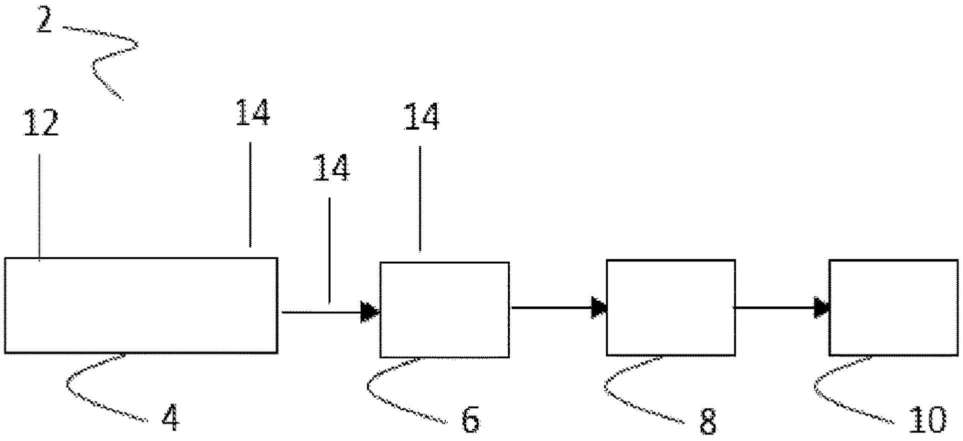
FIG. 1 depicts an example of a melt compounding line (2) in accordance with the present invention.

In accordance with embodiments the present invention, the present inventors have solved the problem of providing stable, crosslinkable compound compositions for use as a cable insulation making compound without the need for a soaking step to incorporate a crosslinking initiator into the composition. In some embodiments the method incorporates a crosslinking initiator, such as a free radical generator compound such as an organic peroxide, into the composition, wherein the free radical generator compound is useful for initiating carbon radical based crosslinking of the thermoplastic polyolefin, optionally with unsaturated crosslinking coagents. Embodiments of the present invention relate methods of making, particularly to high temperature, low scorch, including no scorch, which is defined herein as a scorch time (ts1) at 140° C. of greater than 150 minutes, wherein the scorch times (ts1) at 140° C. is measured as described herein, methods of making crosslinkable compound compositions comprising a thermoplastic polyolefin and additives. Also included are methods of making crosslinked compositions and manufactured articles from the crosslinkable compound compositions. In some embodiments the inventive method and crosslinkable compound composition lack, i.e., are free of, any acid additive. That is, no acidic compound, such as a Brønsted acid such as a sulfonic acid and/or a Lewis acid such as an added dialkyltin dicarboxylate, is added as a constituent in the method or of the composition. Acid additive does not include an acidic by-product or acidic decomposition product, if any, that might be generated in situ by reaction or decomposition of other constituents used herein. As describe later, if desired, a hindered amine stabilizer (HAS) may be included in the method and composition to neutralize any potential in situ generated acidic by-product or acidic decomposition product.

Provided are high temperature, low scorch, including no scorch, which is defined herein as a scorch time (ts1) at 140° C. of greater than 150 minutes, wherein the scorch times (ts1) at 140° C. is measured as described herein, methods of making crosslinkable compound compositions, the method comprising melt compounding a primary stream at a temperature of from 120.0° to 150.0° C., alternatively from 125° to 149° C., wherein the primary stream comprises one or more thermoplastic polyolefins and one or more antioxidants, but lacks curative additives selected from the group consisting of: peroxides and crosslinking coagents; and injecting into the compounded melt a combination of curative additives comprising one or more organic peroxides and one or more crosslinking coagents, and homogeneously mixing the one or more thermoplastic polyolefins, one or more antioxidants, one or more organic peroxides, and one or more crosslinking coagents by melt compounding them together. Also provided are methods of making crosslinked compound compositions and manufactured articles.

For ease of cross-referencing some embodiments of the present invention are described as numbered aspects.

Aspect 1. A high-temperature, low-scorch method of making a crosslinkable compound composition, the method comprising: injecting a combination of curative additives comprising one or more organic peroxides and one or more crosslinking coagents into a melt of an intermediate compound comprising one or more thermoplastic polyolefin polymers and one or more antioxidants (AO), but lacking the one or more curative additives, wherein the melt is at a temperature of 120.0° to 150.0° C. . . . ; and rapidly mixing the curative additives into the melt in less than 60 seconds to make the crosslinkable compound composition as a homogeneous mixture of the one or more thermoplastic polyolefins, the antioxidants, and the curative additives.

Aspect 2. The method of aspect 1 wherein the crosslinkable compound composition has: a scorch time (ts1) at 140° C. of at least 50 minutes, alternatively at least 60 minutes, preferably at least 65 minutes, reported as the time required at 140° C. for an increase of 1 footpound-inch (lbf-in) or 1.13 deciNewton-meter (dN-m) from minimum torque ("ML"), as determined by moving die rheometer (MDR) testing in accordance with ASTM procedure D5289; and a maximum torque (MH) at 182° C. that is at least 1.92 deciNewton-meter (dN-m; equal to at least 1.70 lbf-in) higher than minimum torque (ML) at 182° C., preferably MH is at least 1.92 dN-m higher (at least 1.70 lbf-in higher) than ML at 182° C. and MH at 182° C. is at least 2.09 dN-m (1.85 lbf-in), more preferably at least 2.26 dN-m (2.0 lbf-in), as determined by moving die rheometer (MDR) testing in accordance with ASTM procedure D5289.

Aspect 3. The method of aspect 1 or aspect 2 comprising cooling the crosslinkable compound composition to a temperature of 100° C. or lower, preferably 80° C. or lower, in less than 5 minutes, and preferably further cooling to a temperature of 30° C. or lower in less than 6 hours.

Aspect 4. The method of any one of aspects 1 to 3 wherein the method is a high-temperature, low-scorch method of continuously making a crosslinkable compound composition using a melt compounding line comprising a melt compounding device and a processing system downstream thereof, wherein the melt compounding device has a preparation zone, an injection zone, and a mixing zone, wherein the preparation zone is configured for continuously preparing a melt stream of an intermediate compound and moving the melt stream into the injection zone, wherein the injection zone has a feed point for continuously receiving the melt stream of the intermediate compound and one or more injection points for continuously injecting additives into the melt stream of the intermediate compound in the injection zone; and wherein the mixing zone has one or more mixing elements (e.g., one or more rotor blades or screws, and optionally baffles) configured for rapidly homogenizing (in 60 seconds or less) the injected additives into the melt stream of the intermediate compound; and wherein the mixing zone may be the same as, or downstream from, the injection zone, the method comprises: (A) continuously feeding a melt stream of an intermediate compound at a temperature of from 120.0° to 150.0° C., alternatively from 125° to 149° C., via the feed point into the injection zone of the melt compounding device, the melt stream of the intermediate compound comprising a mixture of: a melt of one or more thermoplastic polyolefin polymers, and one or more antioxidants (AO), but lacking one or more curative additives selected from the group consisting of: organic peroxides and crosslinking coagents; wherein preferably each of the one or more thermoplastic polyolefins is independently selected from the group consisting of: polyethylene homopolymers, ethylene/1-butene copolymers, ethylene/1-hexene copolymers, and ethylene/1-octene copolymers; and more preferably each of the one or more thermoplastic polyolefins is independently selected from the group comprising a low-density polyethylene polymer having a density ranging from 0.87 to 0.94 g/cm$^3$, as measured in accordance with ASTM D792 and a melt index ($I_2$) of from 0.5 to 20 g/10 minutes, as determined in accordance with ASTM D1238, at 190° C./2.16 kg; (B) continuously injecting a combination of curative additives comprising one or more organic peroxides and one or more crosslinking coagents via at least one of the one or more injection points into the melt stream of the intermediate compound in the injection zone of the melt compounding device; (C) rapidly homogenizing by melt compounding the melt stream of the intermediate compound and the injected combination of curative additives to make the crosslinkable compound composition; and (D) continuously discharging a stream of the crosslinkable compound composition from the melt compounding device to the processing system, wherein the combination of curative additives has a residence time in the melt compounding device of 60 seconds or less; and wherein the crosslinkable compound composition comprises: the one or more thermoplastic polyolefin polymers; the one or more antioxidants; the one or more organic peroxides; and the one or more crosslinking coagents; and wherein the crosslinkable compound composition has: a scorch time (ts1) at 140° C. of at least 50 minutes, alternatively at least 60 minutes, preferably at least 65 minutes, reported as the time required at 140° C. for an increase of 1 footpound-inch (lbf-in) or 1.13 deciNewton-meter (dN-m) from minimum torque ("ML"), as determined by moving die rheometer (MDR) testing in accordance with ASTM procedure D5289; and a maximum torque (MH) at 182° C. that is at least 1.92 deciNewton-meter (dN-m; equal to at least 1.70 lbf-in) higher than minimum torque (ML) at 182° C., preferably MH is at least 1.92 dN-m higher (at least 1.70 lbf-in higher) than ML at 182° C. . . . ; and MH at 182° C. is at least 2.09 dN-m (1.85 lbf-in), more preferably at least 2.26 dN-m (2.0 lbf-in), as determined by moving die rheometer (MDR) testing in accordance with ASTM procedure D5289.

Aspect 5. The method as claimed in aspect 4 comprising, after step (D), a processing step (E) (i) or step (E) (II): (E) (i) wherein the processing system comprises a cooling device and a pelletizing device, which may be the same as or different than the cooling device, and step (E) (i) comprises cooling and pelletizing the crosslinkable compound composition to make solid pellets thereof; or (E) (ii) wherein the processing system comprises an annular coater device and a curing device and step (E) (ii) comprises coating a conductor, preferably a wire or optical fiber (fiber optic), with the crosslinkable compound composition to make a coated conductor, and curing the coating to make a cable comprising the conductor and an insulation layer at least partially surrounding the conductor, wherein the insulation layer comprises a crosslinked compound composition made therefrom and the insulation is in direct contact with the conductor or is in indirect contact via one or more intervening layers (e.g., semiconductive layer).

Aspect 6. The method as claimed in aspect 4 or aspect 5 comprising, before the injecting step, preparing the melt stream of the intermediate compound by either melting pellets of the intermediate compound or melting pellets comprising the one or more thermoplastic polyolefin but lacking at least one of the one or more antioxidants, and mixing the melted thermoplastic polyolefin with the at least one of the one or more antioxidants.

Aspect 7. The method as claimed in any one of aspects 4 to 6, wherein prior to the step (B) continuously injecting the combination of curative additives, the method further comprises: pumping the melt stream of the intermediate compound through a melt pump to make a pressurized melt stream; and then melt screening the pressurized melt stream of the intermediate compound through a first melt screen upstream of all of the one or more injection points for injecting the combination of curative additives into the melt stream of the intermediate compound; wherein the melt pump and first melt screen are located upstream of all the injection points of the injection zone of the melt compounding device.

Aspect 8. The method as claimed in any one of aspects 4 to 7, further comprising: at a point upstream of any injection point adding a second thermoplastic polyolefin polymer to the melt stream of the intermediate compound; and melt compounding the second thermoplastic polyolefin polymer and the intermediate compound. Preferably a weight ratio of the added second thermoplastic polyolefin polymer to the weight of the thermoplastic polyolefin polymer in the melt stream of the intermediate compound ranges from 1:1 to 1:4.

Aspect 9. The method as claimed in any one of aspects 4 to 8, wherein the one or more injection points for the injecting the combination of curative additives into the melt stream of the intermediate compound comprises any one or more of the following injection points (i) to (ix): (i) wherein the mixing zone of the melt compounding device has a distributive or kneading section and the one or more injection points is/are at the distributive mixing or the kneading section at a downstream end of the melt compounding device; (ii) at an injection point downstream of the feed point of the injection zone downstream of feeding step (A); (iii) wherein the melt compounding device comprises, sequentially, a second melt screen and a separate melt pump and the one or more injection points is/are downstream of the second melt screen and upstream of the separate melt pump; (iv) wherein the melt compounding device comprises, sequentially, a second melt screen, a separate melt pump, and a second melt pump, and the one or more injection points is/are located between the separate melt pump and the second melt pump; or, (v) a combination of injection points (i) and (ii); (vi) a combination of injection points (i) and (iii); (vii) a combination of injection points (i) and (iv); (viii) a combination of any three of injection points (i) to (iv); or (ix) a combination of each of injection points (i) to (iv).

Aspect 10. The method as claimed in any one of aspects 1 to 9, having any one of limitations (i)-(vii): (i) wherein the one or more antioxidants comprises a mixture of two or more antioxidants, preferably two or three antioxidants; or wherein the one or more crosslinking coagents comprises an alkenyl group-containing monocyclic organosiloxane; or wherein the one or more antioxidants comprises a mixture of two or more antioxidants, preferably two or three antioxidants and the one or more crosslinking coagents comprises an alkenyl group-containing monocyclic organosiloxane; (ii) wherein the one or more crosslinking coagents comprises an alkenyl group-containing monocyclic organosiloxane of formula (I): $[R^1, R^2SiO_{2/2}]_n$ (I), wherein subscript n is an integer greater than or equal to 3; each $R^1$ is independently a $(C_2\text{-}C_4)$ alkenyl or a $H_2C{=}C(R^{1a})\text{—}C({=}O)\text{—}O\text{—}(CH_2)_m\text{—}$, wherein $R^{1a}$ is H or methyl and subscript, and m is an integer from 1 to 4; and each $R^2$ is independently H, $(C_1\text{-}C_4)$ alkyl, phenyl, or is the same as $R^1$; (iii) wherein the one or more organic peroxides comprises dicumyl peroxide or a cumyl group-containing peroxide; (iv) both limitations (i) and (ii); (v) both limitations (i) and (iii); (vi) both limitations (ii) and (iii); (vii) each of limitations (i) to (iii).

Aspect 11. The method as claimed in any one of aspects 1 to 10, wherein there is one thermoplastic polyolefin and the thermoplastic polyolefin has a density as measured in accordance with ASTM D792 ranging from 0.87 to 0.94 g/cm$^3$, and a melt index (12) at 190° C./2.16 kg, of from 0.5 to 20 g/10 min, as determined in accordance with ASTM D1238, and reported in grams eluted per 10 minutes; or wherein the one or more thermoplastic polyolefin polymers comprise the one or more thermoplastic polyethylene polymers, preferably each of the one or more thermoplastic polyolefins is independently selected from the group consisting of: polyethylene homopolymers, ethylene/1-butene copolymers, ethylene/1-hexene copolymers, and ethylene/1-octene copolymers; and more preferably each of the one or more thermoplastic polyolefins is independently selected from the group comprising a low-density polyethylene polymer having a density ranging from 0.87 to 0.94 g/cm$^3$, as measured in accordance with ASTM D792 and a melt index (12) of from 0.5 to 20 g/10 minutes, as determined in accordance with ASTM D1238, at 190° C./2.16 kg.

Aspect 12. The method as claimed in any one of aspects 1 to 11 wherein the crosslinkable compound composition has a hot creep elongation at 200° C. of less than 130%, preferably less than 100%, by testing in accordance with ICEA T-28-562a.

Aspect 13. The method as claimed in any one of aspects 1 to 12 comprising: sampling the crosslinkable compound composition to give at least one sample thereof; measuring, using the sample, the scorch time (ts1) at 140° C. of at least 50 minutes, alternatively at least 60 minutes, preferably at least 65 minutes, reported as the time required at 140° C. for an increase of 1 footpound-inch (lbf-in) or 1.13 deciNewton-meter (dN-m) from minimum torque ("ML"), as determined by moving die rheometer (MDR) testing in accordance with ASTM procedure D5289; and measuring, using the sample, the maximum torque (MH) at 182° C. that is at least 1.92 deciNewton-meter (dN-m; equal to at least 1.70 lbf-in) higher than minimum torque (ML) at 182° C., preferably MH is at least 1.92 dN-m higher (at least 1.70 lbf-in higher) than ML at 182° C.; and MH at 182° C. is at least 2.09 dN-m (1.85 lbf-in), more preferably at least 2.26 dN-m (2.0 lbf-in), as determined by moving die rheometer (MDR) testing in accordance with ASTM procedure D5289.

Aspect 14. The method as claimed in any one of aspects 1 to 13 comprising: shaping a melt of the crosslinkable compound composition to form a shaped crosslinkable compound composition, preferably extruding a melt of the crosslinkable compound composition as an insulation layer covering a conductive core; and curing the shaped crosslinkable compound composition to make a manufactured article comprising a crosslinked compound composition, preferably curing the insulation layer to make an electrical power cable comprising the conductive core and a crosslinked insulation layer.

Aspect 15. The method as claimed in any one of aspects 1 to 14 having one or more of the following limitations (a) to (g): (a) the melt compounding device used in the method is an internal mixer or a screw extruder; (b) the method during or prior to the rapidly homogenizing step (C) does not employ a step of actively cooling (e.g., via a heat exchanger device or cooling zone in an extruder device), or allowing passive cooling of the melt of the intermediate compound from a temperature equal to or greater than 120° C. to a temperature below 120° C., alternatively from a temperature equal to or greater than 141° C. to a temperature below 141° C.; (c) the method independently has from 0 wt % to less than 0.10 wt %, alternatively is free of (i.e., lacks, i.e., 0 wt %) of any one of compounds (i) to (vi): (i) a montmorillonite; (ii) a hydroperoxide; (iii) an N-nitrosodiarylamine; (iv) a maleimide; (v) an imine compound; and (vi) a hydroquinone, wherein each wt % is based on total weight of the intermediate compound and the combination of curative additives; (d) both limitations (a) and (b); (e) both limitations (a) and (c); (f) both limitations (b) and (c); or (g) each of limitations (a), (b), and (c). Regarding limitation (b), cooling is permitted as long as the temperature of the melt stream of the intermediate compound does not fall below 120° C., alternatively below 125° C. Some such embodiments of the present invention are free of both compounds (i) and (ii); alternatively both compounds (i) and (vi); alternatively both compounds (ii) and (vi); alternatively each of compounds (i), (ii), and (vi); alternatively each of compounds (i), (ii), (v), and (vi); alternatively any five of compounds (i) to (vi); alternatively all of compounds (i) to (vi). If any of compounds (i) to (vi) would be found to possess a scorch-retarding effect, which may or may not be found, the minimum amount of such a compound that would be required to show a scorch-retarding effective in the present method would be expected to be at least 0.10 wt %, and likely higher Embodiments of the method are continuous. This means the feeding, injecting, mixing, and discharging steps, and any processing step, of those embodiments operate without interruption (without stopping and restarting) for at least 50 minutes, alternatively at least 60 minutes, alternatively at least 6 hours, alternatively at least 12 hours, alternatively at least 24 hours. If a sufficient quantity of ingredients (e.g., thermoplastic polyolefins, antioxidants, curative additives) are available and if there is no power interruption (e.g., loss of electricity) the method embodiments that are continuous may operate without interruption indefinitely until one or more devices of the melt compounding line needs to be taken out of service for cleaning or repairing. In a typical manufacturing operation the embodiments of the method that are continuous may easily operate without interruption for 7 days, 4 weeks, or 6 months, or longer.

The crosslinkable compound composition made by the high-temperature, low-scorch, including no scorch, which is defined herein as a scorch time (ts1) at 140° C. of greater than 150 minutes, wherein the scorch times (ts1) at 140° C. is measured as described herein, method may be described as an "organic peroxide-containing, homogeneously-mixed crosslinkable compound composition". The "organic peroxide-containing" feature of the crosslinkable compound composition means the composition has a crosslinking-effective amount of undecomposed organic peroxide sufficient to serve as a free-radical generator later during a method of curing of the crosslinkable compound composition to make a crosslinked compound composition. By "crosslinking-effective amount" is meant the maximum torque (MH) at 182° C. limitation described later is met by the composition. The "homogeneously" aspect of the "homogeneously-mixed" feature of the crosslinkable compound composition means that the crosslinkable compound composition has a uniform distribution of constituents throughout a cross-section thereof. The "mixed aspect of the "homogeneously-mixed" feature means that the curative additives including the organic peroxide and crosslinking coagent, were mechanically mixed into the melt stream of the intermediate compound composition by a method that does not include soaking, imbibing, milling (e.g., two-roll milling), calendaring, or acoustic agitating.

In some embodiments of aspects 1 to 15, including the above-described some embodiments thereof having any one of limitations (a) to (g), the combination of curative additives comprises one organic peroxide and two crosslinking coagents. In some such embodiments the organic peroxide is dicumyl peroxide. In some such embodiments at least one of the two crosslinking coagents is triallyl isocyanurate ("TAIC") or 2,4,6,8-tetramethyl-2,4,6,8-tetravinyl-cyclotetrasiloxane ("Vinyl-D4"). In some such embodiments the organic peroxide is dicumyl peroxide and the two crosslinking coagents are TAIC and Vinyl-D4.

The present invention also claims the crosslinkable compound compositions made by the method of any one of aspects 1 to 15. The inventive crosslinkable compound composition differs from a comparative compound composition in at least one property or constituent. The comparative compound composition is one comprising all of the same constituents as the inventive crosslinkable compound composition but the comparative compound composition is made by a different method with respect to incorporation of the one or more organic peroxides. The comparative compound composition is prepared by a comparative method comprising melt compounding all of the same constituents except for the one or more organic peroxides to make a penultimate mixture, pelletizing the penultimate mixture to make pellets thereof; and soaking the same one or more organic peroxides into pellets of the penultimate mixture to make the comparative compound composition in pellet form. The thermal history of the inventive crosslinkable compound composition differs from the thermal history of the comparative compound composition by virtue of the different methods of making same. Thus as a result of the different thermal histories, the inventive crosslinkable compound composition may differ from the comparative compound composition in at least one aspect selected from the group consisting of: proportions of constituents; concentrations of constituents; melt rheology properties; and mechanical properties. Beneficially the inventive method may be more efficient, faster (i.e., have higher productivity), and/or more cost effective than the comparative method involving soaking of the one or more organic peroxides. The improved efficiency of the inventive method may comprise using fewer unit operations or less energy than the comparative method.

Without being bound by theory it is believed that the inventive method makes a crosslinking compound composition inherently having the ts1 at 140° C. of at least 50 minutes, alternatively at least 60 minutes, preferably at least 65 minutes is evidence of low scorch, including no scorch, which is defined herein as a scorch time (ts1) at 140° C. of greater than 150 minutes, wherein the scorch times (ts1) at 140° C. is measured as described herein, of the inventive method, and inherently having the maximum torque (MH) at 182° C. is at least 1.92 dN-m higher (at least 1.70 lbf-in higher) than ML at 182° C. and preferably MH at 182° C. is at least 2.09 dN-m (1.85 lbf-in), more preferably at least 2.26 dN-m (2.0 lbf-in). In this context it is believed that the at least one of the one or more crosslinking coagents independently acts as a scorch resistant additive (SRA) for achieving the ts1 at 140° C. of at least 50 minutes, alternatively at least 60 minutes, preferably at least 65 minutes; or at least one of the one or more crosslinking coagents independently acts as a crosslinking booster additive (CBA) for achieving the maximum torque (MH) at 182° C. is at least 1.92 dN-m higher (at least 1.70 lbf-in higher) than ML at 182° C. and preferably MH at 182° C. is at least 2.09 dN-m (1.85 lbf-in), more preferably at least 2.26 dN-m (2.0 lbf-in); or a combination thereof. The one or more crosslinking coagents may comprise or consist of one crosslinking coagent that acts as both the SRA and the CBA; or two crosslinking coagents, one which acts as the SRA and the other which acts as the CBA. In some embodiments the one or more crosslinking coagents is a crosslinking coagent that acts as the scorch resistant additive (SRA). In some embodiments the maximum torque (MH) at 182° C. is at least 1.92 dN-m higher (at least 1.70 lbf-in higher) than ML at 182° C., alternatively MH at 182° C. is at least 2.26 dN-m (2.0 lbf-in), alternatively from 2.37 dN-m (2.10 lbf-in) to 2.98 dN-m (2.64 lbf-in), alternatively from 2.61 dN-m (2.31 lbf-in) to 2.96 dN-m (2.62 lbf-in). In some embodiments the one or more crosslinking coagents is a crosslinking coagent that acts as the scorch resistant additive (SRA); the ts1 at 140° C. of at least 50 minutes, alternatively at least 60 minutes, preferably at least 65 minutes; and the maximum torque (MH) at 182° C. is at least 2.26 dN-m (2.0 lbf-in), alternatively from 2.37 dN-m (2.10 lbf-in) to 2.98 dN-m (2.64 lbf-in), alternatively from 2.61 dN-m (2.31 lbf-in) to 2.96 dN-m (2.62 lbf-in).

Without being bound by theory it is believed that the melt compounding temperature from 120.0° to 150.0° C., alternatively from 125° to 149° C. is unusually high for use with organic peroxides, that the ts1 at 140° C. of at least 50 minutes, alternatively at least 60 minutes, preferably at least 65 minutes is evidence of low scorch, including no scorch, which is defined herein as a scorch time (ts1) at 140° C. of greater than 150 minutes, wherein the scorch times (ts1) at 140° C. is measured as described herein, of the inventive method, and that the maximum torque (MH) at 182° C. is at least 1.92 dN-m higher (at least 1.70 lbf-in higher) than ML at 182° C., alternatively MH at 182° C. is at least 2.09 dN-m (1.85 lbf-in), preferably at least 2.26 dN-m (2.0 lbf-in) is evidence of the crosslinkability of the crosslinkable compound composition made by the inventive method.

As shown in the inventive examples described later, minimum torque ML at 182° C. is typically 0.16 dN-m or 0.17 dN-m (0.14 lbf-in or 0.15 lbf-in) and using the moving die rheometer (MDR) testing at 182° C. in accordance with ASTM procedure D5289, the torque is increased to from 2.44 dN-m to 2.95 dN-m. (from 2.16 lbf-in to 2.61 lbf-in), depending upon the particular inventive example. Thus during the course of the MDR testing at 182° C. torque rises from the ML value to the MH value, which MH value is where torque value plateaus or no longer increases. As shown by the inventive examples, in some embodiments the maximum torque (MH) at 182° C. is at least 2.7 dN-m higher (at least 2.4 lbf-in higher) than ML at 182° C.

The feeding of the one or more antioxidants and one or more thermoplastic polyolefins into the melt compounding device via the one or more feed points to make a primary stream comprising the one or more antioxidants and the one or more thermoplastic polyolefins (collectively constituents of the primary stream) but lacking one or more curative additives selected from the group consisting of: organic peroxides and crosslinking coagents may be accomplished by any one of the following methods. In an embodiment the at least one of the one or more antioxidants may be fed separately from at least one of the one or more thermoplastic polyolefins into the melt compounding device. In another embodiment at least one of the one or more antioxidants and at least one of the one or more thermoplastic polyolefins may be premixed together to make a combination thereof, and the combination may be fed into the melt compounding device.

In another embodiment, applicable when there are at least two antioxidants or at least two thermoplastic polyolefins or a combination thereof, at least one antioxidant and/or at least one thermoplastic polyolefin is separately fed into the melt compounding device and a combination of at least one antioxidant and at least one thermoplastic polyolefin is separately fed into the melt compounding device.

In accordance with the present embodiments, the injecting the combination of curative additives into the melt stream of the intermediate compound comprises injecting them at any one or more, or all of the following injection points: (i) a distributive mixing or kneading section at a downstream end of the melt compounding device, (ii) at an injection point downstream of melt formation in the melt compounding device itself, (iii) downstream of a melt screen located downstream of the melt compounding device yet upstream of a separate melt pump, preferably, (iv) upstream of a second melt pump located at a point which is downstream of both the separate melt pump and the melt screen in (iii), or (v) any combination thereof.

Preferably, to control the overall melt temperature of the intermediate compound, the methods in accordance with the present invention further comprise adding to the melt stream of the intermediate compound as a second feed a solid thermoplastic polyolefin, such as at any point upstream of or adjacent to all injection point(s), and melt compounding the second feed. The weight ratio of the thermoplastic polyolefin in the second feed to the weight of the thermoplastic polyolefin in the primary stream may range from 1:1 to 1:4, or from 1:1.5 to 1:4, or, more preferably, from 1:2 to 1:4.

Preferably, the thermoplastic polyolefin in the method of the present invention has a density ranging from 0.87 to 0.94 g/cm$^3$, as measured in accordance with ASTM D792 and a melt index (12) of from 0.5 to 20 g/10 min, as determined in accordance with ASTM D1238, at 190° C./2.16 kg, and reported in grams eluted per 10 minutes.

Preferably, the one or more crosslinking coagents in the method of the present invention comprises a monocyclic organosiloxane of formula (I): $[R^1, R^2SiO_{2/2}]_n$ (I), wherein subscript n is an integer greater than or equal to 3; each $R^1$ is independently a ($C_2$-$C_4$) alkenyl or a $H_2C{=}C(R^{1a})$—C(=O)—O—$(CH_2)_m$—, wherein $R^{1a}$ is H or methyl and subscript, and m is an integer from 1 to 4; and each $R_2$ is independently H, ($C_1$-$C_4$) alkyl, phenyl, or is the same as $R^1$, for example, a tetramethyl-tetravinyl-cyclotetrasiloxane, such as 2,4,6,8-tetramethyl-2,4,6,8-tetravinyl-cyclotetrasiloxane.

In another aspect in accordance with the present invention, homogeneous thermoplastic polyolefin crosslinkable compound compositions comprise: a thermoplastic polyolefin polymer, such as a low-density polyethylene polymer, for example, having a density ranging from 0.87 to 0.94 g/cm$^3$, as measured in accordance with ASTM D792 and a melt index ($I_2$) of from 0.5 to 20 g/10 min, or, preferably, from 0.5 to 10 g/10 min, as determined in accordance with ASTM D1238, at 190° C./2.16 kg, and reported in grams eluted per 10 minutes; one or more antioxidants (AO), such as hindered phenols or hindered amines or mixtures thereof; one or more crosslinking coagents, such as an alkenyl group-containing monocyclic organosiloxane of formula (I): $[R^1, R^2SiO_{2/2}]_n$ (I), wherein subscript n is an integer greater than or equal to 3; each $R^1$ is independently a ($C_2$-$C_4$) alkenyl or a $H_2C{=}C(R^{1a})$—C(=O)—O—$(CH_2)_m$—, wherein $R^{1a}$ is H or methyl and subscript, and m is an integer from 1 to 4; and each $R_2$ is independently H, ($C_1$-$C_4$) alkyl, phenyl, or is the same as $R^1$, preferably, a tetramethyl-tetravinyl-cyclotetrasiloxane; and, as a crosslinking initiator, one or more organic peroxides, such as dicumyl peroxide or a cumyl group-containing peroxide. The compositions may further comprise a crosslinking coagent, such as a diallyl or triallyl crosslinking coagent, like triallyl isocyanurate (TAIC). The total amount of the one or more antioxidants may range from 0.01 to 1.5 wt. %, or, preferably, from 0.1 to 1 wt. %, based on the total weight of the crosslinkable compound composition. The total amount of the one or more organic peroxides may range from 0.1 to 2 wt. %, or, preferably, from 0.3 to 1.4 wt. %, based on the total weight of the crosslinkable compound composition. The total amount of the one or more crosslinking coagents may range from 0.1 to 5 wt. %, or, preferably, from 0.3 to 4 wt. %, or, more preferably, from 0.5 to 2 wt. %, all weights based on the total weight of the crosslinkable compound composition. A hindered phenol may be a 2,6-di(tertiary-alkyl)phenol and a hindered amine may include a diradical secondary amino group of formula —C(alkyl)$_2$-N(H)—C(alkyl)$_2$- or a diradical tertiary amino group of formula —C(alkyl)$_2$-N(alkyl)-C(alkyl)$_2$-.

Preferably, the crosslinkable compound composition in accordance with the present invention has within an hour after melt compounding is complete one or more of: (i) a scorch time (ts1) at 140° C. of at least 51 min, or, preferably, at least 55 min, or, more preferably, at least 65 min, reported as the time required for increase of 1 unit (inch-lbf) or 1.13 deciNewton-meter (dN-m) from minimum torque ("ML"), as determined by moving die rheometer (MDR) testing in accordance with ASTM procedure D5289; (ii) a maximum torque (MH) at 182° C. of at least 2.26 dN-m (2.0 lbf-in), as determined by moving die rheometer (MDR) testing in accordance with ASTM procedure D5289, or (iii) a hot creep elongation as determined in accordance with ICEA T-28-562 at 200° C. of below 100%.

In accordance with the present invention, methods of injecting peroxide and one or more crosslinking coagents that act as scorch resistant additive (SRA) into a melt stream of a thermoplastic polyolefin polymer, such as low-density polyethylene polymers, provide a homogeneous thermoplastic polyolefin crosslinkable compound right away, even before it has cooled from processing. Injecting during melt compounding, such as into a melt compounding device, mixer, extruder or kneader or distributive mixing element thereof, does not require a melt cooling step or post-processing with an initiator to make a crosslinkable compound, such as pellets or other raw material, suitable for later use as for cable insulation making compounds. The melt compounding methods of the present invention consistently provide fully-formulated products, without a melt cooling step or use of soaking the polyolefin compound with crosslinking initiator. The homogeneous thermoplastic polyolefin crosslinkable compound in accordance with the present invention comprises a fully incorporated crosslinking initiator solely upon melt processing. The crosslinkable compound materials of the present invention comprise homogeneous thermoplastic polyolefin compounds right after melt compounding. The composition or product in accordance with the present invention comprises a crosslinkable homogeneous intermediate compound with a high scorch time. Thus, the method of the present invention avoids the need for an impregnation (soaking) facility. The fully-formulated products or homogeneous thermoplastic polyolefin crosslinkable compounds of the present invention, such as pellets, are storage stable and enable separate in-line article fabrication at a later stage, i.e. separate extruding and shaping into a manufactured article, such as cable insulation. In contrast to the homogeneous thermoplastic polyolefin crosslinkable compounds of the present invention, thermoplastic polyolefin crosslinkable compounds made by soaking are not fully formulated, homogeneous, batch stable or even crosslinkable after melt compounding. In fact, moving die rheometer (MDR) testing of a crosslinkable compound composition as in the present invention show that when the compound is made by a soaking process, the initiator, such as dicumyl peroxide (DCP), does not diffuse into the matrix of the thermoplastic polyolefin without an additional heat treatment (e.g. at 70° to 80° C. for a minimum of 2 hours) to remove initiator at the surface of the pellets; and, even with heat treatment, the initiator takes time to fully diffuse into the polyolefin matrix. In accordance with the present invention, however, the DCP, both by re-orientation of the melt stream (mixing) and diffusion a uniform distribution of DCP is created in the polyolefin matrix right away after melt compounding. Thus, the present invention provides crosslinkable compounds having within an hour after melt compounding is complete one or more of (i) a scorch time (ts1) at 140° C. of at least 51 min, or, preferably, at least 55 min, reported as the time required for increase of 1 unit (inch-lb) or 1.13 deciNewton-meter (dN-m) from minimum torque ("ML"), as determined by moving die rheometer (MDR) testing in accordance with ASTM procedure D5289, and/or (ii) a maximum torque (MH) at 182° C. of at least 2.26 dN-m (2.2 lbf-in), as determined by moving die rheometer (MDR) testing in accordance with ASTM procedure D5289.

All ranges recited are inclusive and combinable. For example, a disclosed amount of organic peroxide ranging from 0.1 to 2 wt. %, or, preferably, from 0.3 to 1.4 wt. %, or, preferably, from 0.4 to 1.2 wt. %, or, preferably, from less than 0.5 to 1 wt. %, based on the total weight of the crosslinkable compound composition would include from 0.1 to 2 wt. %, or, from 0.1 to 1.4 wt. %, or, from 0.1 to 1.2 wt. %, or, from 0.1 to 1 wt. %, or, from 0.3 to 2 wt. %, or, preferably, from 0.3 to 1.4 wt. %, or, preferably, from 0.3 to 1.2 wt. %, or, preferably, from 0.3 to 1 wt. %, or, preferably, from 0.4 to 1.4 wt. %, or, preferably, from 0.4 to 1.2 wt. %, or, preferably, from 0.4 to 1 wt. % or, preferably, from less than 0.5 to 1.4 wt. %, or, preferably, from less than 0.5 to 1.2 wt. %, or, preferably, from less than 0.5 to 1 wt. %, or, preferably, from 0.3 to 0.4 wt. %, or, preferably, from 0.3 to less than 0.5 wt. %, or, preferably, from 0.4 to less than 0.5 wt. %, or, from 0.3 to 2 wt. %, or, from 0.4 to 2 wt. %, or, from less than 0.5 to 2 wt. %.

Unless otherwise indicated, conditions of temperature and pressure are room temperature (23° C.) and standard pressure (101.3 kPa), also referred to as "ambient conditions". And, unless otherwise indicated, all conditions include a relative humidity (RH) of 50%.

Unless otherwise indicated, any term containing parentheses refers, alternatively, to the whole term as if parentheses were present and the term without them, and combinations of each alternative. Thus, as used herein the term, "(meth)acrylate" and like terms is intended to include acrylates, methacrylates and their mixtures.

As used herein, the term "ASTM" refers to publications of ASTM International, Conshohocken, Pennsylvania, USA.

As used herein. The term "ICEA" refers to publications of the Insulated Cable Engineers Association, Miamitown, Ohio, USA.

As used herein, the term "melt index" or "12" refers to the result determined in accordance with ASTM D1238, at 190° C./2.16 kg, and reported in grams eluted per 10 minutes.

As used herein, the term "organic peroxide" denotes a peroxide having the structure: $R^1$—O—O—$R^2$, or $R^1$—O—R—O—O—$R^2$, where each of $R^1$ and $R^2$ is a hydrocarbyl moiety, and R is a hydrocarbylene moiety. As used herein, the term "hydrocarbyl" denotes a univalent group made by removing a hydrogen atom from a hydrocarbon (e.g. ethyl, phenyl). As used herein, the term "hydrocarbylene" denotes a divalent group made by removing two hydrogen atoms from a hydrocarbon.

As used herein, the term "polymer" means a macromolecular compound prepared by reacting (i.e., polymerizing) monomers of the same or different type, and includes homopolymers and copolymers. The term "copolymer" means a polymer prepared by the polymerization of at least two different monomers as reactants, and includes copolymers prepared from two different monomers, as well as polymers prepared from more than two different monomers, e.g., terpolymers, tetrapolymers (four different monomers) and so on. As used herein, "homopolymer" denotes a polymer comprising repeating units derived from a single monomer, but does not exclude residual amounts of other components used in preparing the homopolymer, such as chain transfer agents.

As used herein, the term "solids" refers to a crystalline or amorphous substance that does not flow perceptibly under moderate stress, has a definite capacity for resisting forces which tend to deform it, and under ordinary conditions retains a definite size and shape.

As used herein, the phrase "wt. %" stands for weight percent.

The proposed invention provides a homogeneous intermediate compound via a single melt mixing method using, for example, conventional melt compounding equipment at temperatures up to degradation temperature of the polymer. In the melt mixing method of the present invention, the temperature remains below 150° C., or, preferably, below 140° C., and above the melting point of the thermoplastic polyolefin polymer.

Pressure is required to push a melt through a screen in a screening step or through a die in a pelletizing step. Some melt compounding devices that may be used in the method generate sufficient pressure to do screening or pelletizing (i.e., they are "sufficient pressure generating"). Other melt compounding devices that may be used in the method do not generate sufficient pressure for screening and/or pelletizing (i.e., they generate insufficient pressure), in which aspects a melt pump or single screw extruder may also be used for generating the sufficient pressure. Thus, the melt compounding device may, but is not required to generate sufficient pressure for melt screening or pelletizing. Examples of melt compounding devices that generate sufficient pressure for screening or pelletizing are single-screw extruders and some twin-screw extruders. Examples of melt compounding devices that do not generate sufficient pressure for screening or pelletizing are some twin-screw extruders, internal batch mixers (e.g. Farrel-Pomini Banbury and Kobelco Stewart Bolling mixers), co-rotating intermeshing twin screw extruder not configured for sufficient pressure generation for melt screening or pelletizing, and counter-rotating non-intermeshing twin-screw extruder (e.g., Farrel FCM and LCM, Kobe Steel LCM, Japan Steel Works (JSW) Continuous Intensive Mixer (CIM) or CIMP).

Suitable melt compounding or melt mixing equipment comprises, moving from upstream to downstream in melt flow, at least one melt compounding device, and, further, comprises a distributive mixing element (i) in the melt-compounding device such as a gear mixer or gear mixing element, or, (ii) as a melt pump located downstream of the melt compounding device, or (iii) both, and, still further, comprises a melt screening unit. The melt mixing equipment may further comprise a pelletizer or pelletizing die. Preferably, the melt mixing equipment comprises two melt pumps, one located upstream of the melt screen and the other located downstream of the melt screen.

To make the homogeneous intermediate compound of the present invention, a primary feed of the thermoplastic polyolefin polymer and one or more antioxidants are melt compounded or mixed in a melt compounding device to make a melt stream of an intermediate compound. To make the homogeneous crosslinkable compound of the present invention, the curative additives are then injected into and mixed homogeneously by continuing melt compounding the melt stream of the intermediate compound at the downstream end of or downstream of the melt compounding device. Suitable devices for making a homogeneous melt compound comprise distributive mixing devices or segments in an extruder, such as toothed mixing element (TME, ZME, etc.) and kneading blocks, like kneading blocks (forward, neutral or reverse pumping), gear mixers, melt pumps, gear pumps, or blister elements, when coupled with downstream mixing elements.

Injecting the combination of curative additives into a melt stream of an intermediate compound comprises injecting them into an injection point at any of: (i) a distributive mixing or kneading section at the downstream end of the melt compounding device, (ii) in line downstream of melt formation, which point can be in the melt compounding device itself, or (iii) upstream of a separate melt pump or other short mixing device. The injection point is, preferably, located downstream of a melt screen which is itself located downstream of the melt pump. Preferably, the melt compounding device comprises a twin melt pump arrangement further comprising a second downstream melt pump and a melt screening device located between the melt pump and the second downstream melt pump; the two melt pumps straddle the melt screen. In the twin melt pump version, injecting the combination of curative additives comprises melt pumping the melt stream of the intermediate compound to make a pressurized melt stream, melt screening the pressurized melt stream of the intermediate compound and injecting into the melt stream the combination of curative additives at an injection point downstream of the melt screen, which point can be in or just upstream of the second downstream melt pump.

Suitable injection points for the combination of curative additives may comprise both of (i) a distributive mixing or kneading section at a downstream end of the melt compounding device and (ii) an injection point downstream of melt formation in the melt compounding device itself; both of (i) a distributive mixing or kneading section at a downstream end of the melt compounding device and (iii) downstream of a melt screen located downstream of the melt compounding device yet upstream of a separate melt pump; (i) a distributive mixing or kneading section at a downstream end of the melt compounding device and (iv) upstream of a second melt pump located at a point which is downstream of both the separate melt pump and the melt screen in (iii); both of (ii) an injection point downstream of melt formation in the melt compounding device itself and (iii) downstream of a melt screen located downstream of the melt compounding device yet upstream of a separate melt pump; both of (ii) an injection point downstream of melt formation in the melt compounding device itself and (iv) upstream of a second melt pump located at a point which is downstream of both the separate melt pump and the melt screen in (iii); or both of (iii) downstream of a melt screen located downstream of the melt compounding device yet upstream of a separate melt pump and (iv) upstream of a second melt pump located at a point which is downstream of both the separate melt pump and the melt screen in (iii).

Further, suitable injection points for the combination of curative additives may include all three of (i) a distributive mixing or kneading section at a downstream end of the melt compounding device, (ii) at an injection point downstream of melt formation in the melt compounding device itself, and (iii) downstream of a melt screen located downstream of the melt compounding device yet upstream of a separate melt pump; all three of (ii) at an injection point downstream of melt formation in the melt compounding device itself, (iii) downstream of a melt screen located downstream of the melt compounding device yet upstream of a separate melt pump and (iv) upstream of a second melt pump located at a point which is downstream of both the separate melt pump and the melt screen in (iii); all three of (i) a distributive mixing or kneading section at a downstream end of the melt compounding device, (iii) downstream of a melt screen located downstream of the melt compounding device yet upstream of a separate melt pump, and (iv) upstream of a second melt pump located at a point which is downstream of both the separate melt pump and the melt screen in (iii); all three of (i) a distributive mixing or kneading section at a downstream end of the melt compounding device, (ii) at an injection point downstream of melt formation in the melt compounding device itself, and (iv) upstream of a second melt pump located at a point which is downstream of both the separate melt pump and the melt screen in (iii); or, all three of (ii) at an injection point downstream of melt formation in the melt compounding device itself, (iii) downstream of a melt screen located downstream of the melt compounding device yet upstream of a separate melt pump, and (iv) upstream of a second melt pump located at a point which is downstream of both the separate melt pump and the melt screen in (iii).

Preferably, to control the overall melt temperature of the melt stream of the intermediate compound, the methods of the present invention further comprise adding a second solid feed of the thermoplastic polyolefin polymer downstream of the primary solid feed of the thermoplastic polyolefin polymer, such as at any point upstream of every injection point or adjacent to the injection point furthest upstream, and melt compounding the second feed. By introducing second polymer feed, such as at a weight ratio of second polymer feed to the initial polymer feed of from 1:1 to 1:4, or, preferably, from 1:2 to 1:4, the overall melt temperature of the melt stream of the intermediate compound and the resulting crosslinkable compound can be lowered significantly. The enthalpy from the initial thermoplastic polyolefin polymer melt stream melts the second polymer feed and achieves improved temperature control over the melt, i.e., lowered melt temperature.

Suitable melt compounding devices for use in accordance with the present invention may include, for example, co-rotating intermeshing twin-screw extruders, batch mixers, counter-rotating non-intermeshing twin-rotor mixers (e.g., Farrel, FCM), or single-screw extruders. A broader selection of compounding devices may be used where the methods of the present invention comprise delivering the melt stream of the intermediate compound to a melt pump and melt screening the pressurized melt stream upstream of any injection point, i.e. place for injecting the combination of curative additives into the melt stream. In such a case, the melt compounding device may comprise any of the above listed compounders, a co-rotating intermeshing twin-screw extruder, internal batch mixer, or counter-rotating non-intermeshing twin-screw compounding mixer. Without sufficiently rapid and thorough curative incorporation into the melt by the means described, the resulting composition exhibited severe scorch or decomposition of the organic peroxide. For example, experiments on a comparative Banbury mixer discharging at a melt temperature of 125° C. and downstream addition of the combination of curative additives resulted in severe scorch rendering the compound unusable.

Suitable melt screening devices for use in accordance with the present invention may include, for example, continuous screening or filtering technology, such as a continuous plate, rotating screen changer, slide plate screen changer, dual bolt or chamber screen changer or any candle, pleated candle, disk, cylinder, or flat plate filtering element with a woven or non-woven filter medium able to stop particles ranging in size from 25 μm to 500 μm, such as, for example, polymer gels.

Suitable melt pumps for use in accordance with the present invention may include any known in the art, e.g. MAAG, Farrel-Pomini, gear mixers or appropriately modified to enhance mixing twin gear pressure generating melt pumps.

The present invention further provides homogeneous thermoplastic polyolefin crosslinkable compounds comprising a thermoplastic polyolefin, one or more antioxidants (AO), one or more crosslinking coagents, and one or more free radical initiators. The compositions may further comprise one or more crosslinking coagents.

In accordance with the present invention, the crosslinkable compounds have within an hour after melt compounding is complete a scorch time (ts1) at 140° C. of at least 51 min, or, preferably, at least 55 min, reported as the time required for increase of 1 unit (inch-lb) or 1.13 deciNewton-meter (dN-m) from minimum torque ("ML"), as determined by moving die rheometer (MDR) testing in accordance with ASTM procedure D5289, and/or a maximum torque (MH) at 182° C. of at least 2.26 dN-m (2.2 lbf-in), or, preferably, at least 2.36 dN-m (2.3 lbf-in) as determined by moving die rheometer (MDR) testing in accordance with ASTM procedure D5289.

The terms "thermoplastic polyolefin" and "TPO" are used herein to refer to homopolymers made by polymerizing a single unsaturated hydrocarbon monomer and copolymers made by polymerizing two or more different unsaturated hydrocarbon monomers, wherein each unsaturated hydrocarbon monomer consists of carbon atoms and hydrogen atoms. Examples of unsaturated hydrocarbon monomers are ethylene; propylene; ($C_4$-$C_{20}$) alpha-olefins; and 1,3-butadiene. In some embodiments the TPO is a polyethylene homopolymer or an ethylene/($C_4$-$C_{20}$) alpha-olefin copolymer. The ($C_4$-$C_{20}$) alpha-olefin is a compound of formula $H_2C{=}C(H){-}(CH_2)_qCH_3$, wherein subscript q is an integer from 1 to 17. In some embodiments the ($C_4$-$C_{20}$) alpha-olefin is 1-butene, 1-hexene, or 1-octene; alternatively 1-butene or 1-hexene; alternatively 1-octene; alternatively 1-hexene; alternatively 1-butene.

Suitable thermoplastic polyolefins may comprise polymers prepared from ethylene monomers as the primary (i.e., greater than 50 wt. %) monomer component, though other comonomers may also be employed. The ethylene polymer can be an ethylene homopolymer, or an ethylene/alpha-olefin ("α-olefin") copolymer having an α-olefin comonomer content of at least 1 wt. %, at least 5 wt. %, at least 10 wt. %, at least 15 wt. %, at least 20 wt. %, or at least 25 wt. % based on the total weight of monomers used to make the copolymer. Such copolymers can have an α-olefin content of less than 50 wt. %, less than 45 wt. %, less than 40 wt. %, or less than 35 wt. % based on the weight of the copolymer. Suitable α-olefins may be a $C_3$-20 (i.e., having 3 to 20 carbon atoms), or $C_{4-20}$ (i.e., having 4 to 20 carbon atoms), linear, branched or cyclic α-olefin. Examples of $C_{3-20}$ α-olefins include, for example, propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/butene, ethylene/1-hexene, ethylene/1-octene, ethylene/styrene, ethylene/propylene/1-octene, ethylene/propylene/butene, ethylene/butene/1-octene, and ethylene/butene/styrene. Further, the ethylene polymer can be used alone or in combination with one or more other types of ethylene polymers (e.g., a blend of two or more ethylene polymers that differ from one another by monomer composition and content, catalytic method of preparation, etc.). If a blend of ethylene polymers is employed, the polymers can be blended by any in-reactor or post-reactor process.

The ethylene polymer can be selected from the group consisting of low-density polyethylene ("LDPE"), linear-low-density polyethylene ("LLDPE"), very-low-density polyethylene ("VLDPE"), and combinations of two or more thereof. LDPEs are generally highly branched ethylene homopolymers, and can be prepared via high pressure processes (i.e., HP-LDPE). LDPEs suitable for use herein can have a density ranging from 0.91 to 0.94 g/cm$^3$ or, for example, at least 0.915 g/cm$^3$ but less than 0.94, or less than 0.93 g/cm$^3$. Polymer densities provided herein are determined in accordance with ASTM method D792. LDPEs suitable for use herein can have a melt index (12) of less than 20 g/10 min., or ranging from 0.1 to 10 g/10 min., from 0.5 to 5 g/10 min., from 1 to 3 g/10 min., or an 12 of 2 g/10 min. Melt indices provided herein are determined according to ASTM method D1238. Unless otherwise noted, melt indices are determined at 190° C. and 2.16 Kg (a.k.a., 12). Generally, LDPEs have a broad molecular weight distribution ("MWD") resulting in a high polydispersity index ("PDI", or the ratio of weight-average molecular weight to number-average molecular weight). The ethylene polymer can be an LLDPE, such as a polymer having a heterogeneous distribution of comonomers (e.g., α-olefin monomer), and characterized by short-chain branching. For example, LLDPEs can be copolymers of ethylene and α-olefin monomers having a density ranging 0.916 to 0.925 g/cm$^3$. LLDPEs suitable for use herein can have a melt index (12) ranging from 1 to 20 g/10 min., or from 3 to 8 g/10 min. The ethylene polymer can be a VLDPE or an ultra-low-density polyethylene, or ULDPEs. VLDPEs are generally ethylene polymers having a heterogeneous distribution of comonomer (e.g., α-olefin monomer), and characterized by short-chain branching. For example, VLDPEs can be copolymers of ethylene and α-olefin monomers, such as one or more of those α-olefin monomers described above. VLDPEs suitable for use herein can have a density ranging from 0.87 to 0.915 g/cm$^3$. VLDPEs suitable for use herein can have a melt index (12) ranging from 0.1 to 20 g/10 min., or from 0.3 to 5 g/10 min. Still further, the ethylene polymer in accordance with the present invention can comprise a combination of any two or more of the above-described ethylene polymers.

The thermoplastic polyolefins polymers of the present invention are made by methods widely varied, and known in the art. Any conventional or hereafter discovered production process for producing suitable ethylene polymers may be employed for preparing the ethylene polymers of the present invention. In general, polymerization can be accomplished at conditions known in the art for Ziegler-Natta or Kaminsky-Sinn polymerization reactions, that is, at temperatures from 0° to 250° C., or from 30° or 200° C., and at pressures from 100 to 10,000 atmospheres (1,013 megaPascals ("MPa")) preferably from 500 to 10,000 atmospheres. In most polymerization reactions, the molar ratio of polymerization catalyst to monomers ranges from 10-12:1 to 10-1:1, or from 10-9:1 to 10-5:1.

In some embodiments, the primary stream comprising the one or more antioxidants and the one or more thermoplastic polyolefins (collectively constituents of the primary stream) but lacking one or more curative additives selected from the group consisting of: organic peroxides and crosslinking coagents, and the melt stream of an intermediate compound made therefrom (the intermediate compound comprising a mixture of: the one or more thermoplastic polyolefin polymers, and the one or more antioxidants (AO), but lacking the one or more curative additives) is free of any other polymer. In such embodiments the polymer constituent(s) of the primary stream and the intermediate compound made therefrom consist of one or more of the thermoplastic polyolefins. In such embodiments the polymer constituent(s) of the crosslinkable compound composition made by the inventive method consist of the one or more of the thermoplastic polyolefins and the polymer constituent(s) of the crosslinked compound composition made by curing the crosslinkable compound composition independently consist of the one or more thermoplastic polyolefins and/or crosslinked polyolefins made by curing same.

In some embodiments, the primary stream comprising the one or more antioxidants and the one or more thermoplastic polyolefins (collectively constituents of the primary stream) but lacking one or more curative additives selected from the group consisting of: organic peroxides and crosslinking coagents, and the melt stream of an intermediate compound made therefrom (the intermediate compound comprising a mixture of: the one or more thermoplastic polyolefin polymers, and the one or more antioxidants (AO), but lacking the one or more curative additives) also contains a polymer that is not a thermoplastic polyolefin. Examples of a polymer that is not a thermoplastic polyolefin and that may be contained in these embodiments are ethylene/unsaturated carboxylic ester copolymers. Examples of ethylene/unsaturated carboxylic ester copolymers that may be used are ethylene/alkyl acrylate (EAA) copolymers, ethylene/alkyl methacrylate (EAMA) copolymers, and ethylene/vinyl acetate (EVA) copolymers. Examples of ethylene/alkyl acrylate copolymers are ethylene/methyl acrylate (EMA) copolymers, ethylene/ethyl acrylate (EEA) copolymers, and ethylene/butyl acrylate (EBA) copolymers. Examples of ethylene/alkyl methacrylate copolymers are ethylene/methyl methacrylate (EMMA) copolymers, ethylene/ethyl methacrylate (EEMA) copolymers, and ethylene/butyl methacrylate (EBMA) copolymers. In such embodiments the polymer constituent(s) of the primary stream and the intermediate compound made therefrom consist of one or more of the thermoplastic polyolefins and one or more ethylene/unsaturated carboxylic ester copolymers. The proportion of the one or more ethylene/unsaturated carboxylic ester copolymer(s) used in such embodiments of the primary stream may be from 0.05 wt % to 20 wt %, alternatively from 0.10 to 15 wt %, alternatively from 0.10 to 5 wt %, based on total weight of the primary stream and the proportion of the one or more ethylene/unsaturated carboxylic ester copolymer(s) used in such embodiments of the intermediate compound independently may be from 0.05 wt % to 20 wt %, alternatively from 0.10 to 15 wt %, alternatively from 0.10 to 5 wt %, based on total weight of the intermediate compound. Embodiments of the crosslinkable compound composition made therefrom according to the inventive method also contain the one or more ethylene/unsaturated carboxylic ester copolymer(s) and the crosslinked compound composition made by curing such embodiments contain crosslinked products thereof.

Suitable antioxidants (AO) may comprise tertiary amines, secondary or tertiary thiols, secondary or tertiary phenols, bisphenols, trisphenols and tetraphenols, or, preferably, combinations of two or more of these. Examples of suitable antioxidants may include, for example, (4-(1-methyl-1-phenylethyl) phenyl) amine (e.g., NAUGARD 445, Addivant USA, Danbury, CT); 2,2-methylene-bis(4-methyl-6-t-butyl phenol) (e.g., VANOX MBPC, Vanderbilt Chemicals, New York, NY); 2,2-thiobis(2-t-butyl-5methyl)phenol (CAS No. 90-66-4); 4,4'-thiobis (2-t-butyl-5 methylphenol) also known as 4,4'-thiobis(6-tert-butyl-m-cresol), CAS No. 96-69-5, LOWINOX TBM 6 antioxidant, Addivant); 2,2'-thiobis(6-t-butyl-4-methylphenol) (CAS No. 90-66-4, commercially LOWINOX TBP-6); tris[(4-tert-butyl-3-hydroxy-2,6-dimethylphenyl) methyl)-1,3,5-triazine-2,4,6 trione (e.g., CYANOX 1790 antioxidant, Solvay Chemicals, Syracuse, NY); pentaerythritol tetrakis(3-(3,5-bis(1,1-dimethylethyl)-4-hydroxyphenyl) propionate (e.g., IRGANOX 1010 antioxidant, CAS Number 6683-19-8); 3,5-bis (1,1 dimethylethyl)-4-hydroxybenzenepropanoic acid 2,2'-thiodiethanediyl ester (e.g., IRGANOX 1035 antioxidant, CAS Number 41484-35-9, BASF, Ludwigshafen, DE); distearyl thiodipropionate (DSTDP); dilauryl thiodipropionate (e.g., IRGANOX PS 800 antioxidant); stearyl 3-(3,5-di-t-butyl-4-hydroxyphenyl) propionate (e.g., IRGANOX 1076); 2,4-bis (dodecylthiomethyl)-6-methylphenol (IRGANOX 1726 antioxidant); 4,6-bis(octylthiomethyl)-o-cresol (e.g. IRGANOX 1520 antioxidant); and 2,3-bis[[3-[3,5-di-tert-butyl-4-hydroxyphenyl]propionyl]]propionohydrazide (IRGANOX 1024 antioxidant). Preferably, the one or more antioxidants comprises 4,4'-thiobis(2-t-butyl-5-methylphenol, also known as 4,4-thiobis(6-tert-butyl-m-cresol); 2,2'-thiobis(6-t-butyl-4-methylphenol); tris[(4-tert-butyl-3-hydroxy-2,6-dimethylphenyl) methyl]-1,3,5-triazine-2,4,6 trione; distearyl thiodipropionate or dilauryl thiodipropionate; or a combination of any two or more thereof. More preferably, the antioxidant may be a combination of tris[(4-tert-butyl-3-hydroxy-2,6-dimethylphenyl) methyl)-1,3,5-triazine-2,4,6-trione and distearyl thiodipropionate.

The total amount of the one or more antioxidants may be from 0.01 to 1.5 wt. %, or, from 0.05 to 1.2 wt. %, or, from 0.1 to 1 wt. %, based on the total weight of the crosslinkable compound composition.

In accordance with the present invention, the ethylene polymer is combined with one or more organic peroxides as a crosslinking initiator. Suitable free radical initiators have a decomposition at least as high as the melting point of the ethylene polymer and may comprise any dialkyl, diaryl, dialkaryl, or diaralkyl(di) peroxide, having the same or differing alkyl, aryl, alkaryl, or aralkyl moieties. In a formula having the structure: $R^1$—O—O—$R^2$, or $R^1$—O—O—R—O—O—$R^2$, where each of $R^1$ and $R^2$ is, independently, a hydrocarbyl moiety, and R is a hydrocarbylene moiety, each of $R^1$ and $R^2$ is independently a $C_1$ to $C_{20}$ or $C_1$ to $C_{12}$ alkyl, aryl, alkaryl, or aralkyl moiety; R can be a $C_1$ to $C_{20}$ or $C_1$ to $C_{12}$ alkylene, arylene, alkarylene, or aralkylene moiety; R, $R^1$, and $R^2$ can have the same or a different number of carbon atoms, or any two of R, $R^1$, and $R^2$ can have the same number of carbon atoms while the third has a different number of carbon atoms. Organic peroxides suitable for use herein include mono-functional peroxides and di-functional peroxides. As used herein, "mono-functional peroxides" denote peroxides having a single pair of covalently bonded oxygen atoms (e.g., having a structure R—O—O—R). As used herein, "difunctional peroxides" denote peroxides having two pairs of covalently bonded oxygen atoms (e.g., having a structure R—O—O—R—O—R). Difunctional or higher functional peroxides may be called co-crosslinkers.

Exemplary organic peroxides include dicumyl peroxide ("DCP"), tert-butyl peroxybenzoate, di-tert-amyl peroxide ("DTAP"); isopropylcumyl t-butyl peroxide; t-butylcumylperoxide; di-t-butyl peroxide; isopropylcumyl cumylperoxide; di(isopropylcumyl) peroxide and mixtures of two or more thereof. Suitable difunctional peroxides may include bis(t-butyl-peroxy isopropyl)benzene ("BIPB"), 2,5-bis(t-butylperoxy)-2,5-dimethylhexane; 2,5-bis(t-butylperoxy)-2,5-dimethylhexyne-3; 1,1-bis(t-butylperoxy) 3,3,5-trimethylcyclohexane; butyl 4,4-di(tert-butylperoxy)valerate; 2,5-bis (tert-butylperoxy)-2,5-dimethyl-3-hexyne and mixtures of two or more thereof. Often, only a single type of organic peroxide is employed. Preferably, the organic peroxide is dicumyl peroxide or is a cumyl group-containing peroxide.

The crosslinkable compound composition in accordance with the present invention can comprise the one or more organic peroxides in an amount ranging from 0.1 to 2 wt. %, or, preferably, from 0.3 to 1.4 wt. %, or, preferably, from 0.4 to 1.2 wt. %, or, preferably, from less than 0.5 to 1 wt. %, based on the total weight of the crosslinkable compound composition.

Suitable crosslinking coagents may comprise, for example, any monocyclic organosiloxane of formula (I): $[R^1, R^2SiO_{2/2}]_n$ (I), wherein subscript n is an integer greater than or equal to 3; each $R^1$ is independently a $(C_2\text{-}C_4)$ alkenyl or a $H_2C{=}C(R^{1a})—C({=}O)—O—(CH_2)_m—$, wherein $R^{1a}$ is H or methyl and subscript, and m is an integer from 1 to 4; and each $R_2$ is independently H, $(C_1\text{-}C_4)$ alkyl, phenyl, or is the same as $R^1$.

Suitable examples of crosslinking coagents for use in the present invention may include, for example, any of the formula (I), above, wherein: (i) each $R^1$ is independently a $(C_2\text{-}C_3)$ alkenyl group; and each $R_2$ is independently H, a $(C_1\text{-}C_2)$ alkyl group, or a $(C_2\text{-}C_3)$ alkenyl group; (ii) each $R^1$ is vinyl; and each $R_2$ is, independently, a $(C_1\text{-}C_2)$ alkyl group; (iii) each $R^1$ is vinyl; and each $R_2$ is methyl; (iv) each $R^1$ is allyl; and each $R_2$ is, independently, a $(C_1\text{-}C_2)$ alkyl group; (v) each $R^1$ is allyl; and each $R_2$ is methyl; (vi) each $R^1$ is, independently, $H_2C{=}C(R^{1a})—C({=}O)—O—(CH_2)_m—$, wherein $R^{1a}$ is H or methyl and subscript m is an integer from 1 to 4; and each $R_2$ is, independently, H, a $(C_1\text{-}C_2)$ alkyl group, or a $(C_2\text{-}C_3)$ alkenyl group; (vii) each $R^1$ is independently $H_2C{=}C(R^{1a})—C({=}O)—O—(CH_2)_m—$, wherein $R^{1a}$ is H and subscript m is 3; and each $R_2$ is, independently, a $(C_1\text{-}C_2)$ alkyl group; (viii) each $R^1$ is, independently, $H_2C{=}C(R^{1a})—C({=}O)—O—(CH_2)_m—$, wherein $R^{1a}$ is methyl and subscript m is 3; and each $R_2$ is, independently, a $(C_1\text{-}C_2)$ alkyl group. More than one crosslinking coagent can be used. Suitable crosslinking coagents may include, for example, 2,4,6-trimethyl-2,4,6-trivinyl-cyclotrisiloxane, 2,4,6,8-tetramethyl-2,4,6,8-tetravinyl-cyclotetrasiloxane, 2,4,6,8,10-pentamethyl-2,4,6,8,10-pentavinyl-cydopentasiloxane or a tetramethyl-tetravinyl-cyclotetrasiloxane, or mixtures thereof.

The amount of the one or more crosslinking coagents in the crosslinkable compound composition may be from 0.1 to 5 wt. %, or, preferably, from 0.3 to 4 wt. %, or, preferably, from 0.3 to 3.5 wt. %, such as, preferably, from 0.5 to 2 wt. %, all weights based on the total weight of the crosslinkable compound composition.

Suitable crosslinking coagents for use in the present invention may comprise di-functional and higher functional monomers capable of copolymerizing with an ethylene polymer. The crosslinking coagent may include a polyallyl or polyvinyl crosslinking coagent. As used herein, "polyallyl" denotes a compound having at least two pendant allyl functional groups, for example, a triallyl compound selected from the group consisting of triallyl isocyanurate ("TAIC"), triallyl cyanurate ("TAC"), triallyl trimellitate ("TATM"), and mixtures of two or more thereof. Examples of suitable crosslinking coagents include polyallyl crosslinking coagents, such as triallyl isocyanurate ("TAIC"), triallyl cyanurate ("TAC"), triallyl trimellitate ("TATM"), triallyl orthoformate, pentaerythritol triallyl ether, triallyl citrate, and triallyl aconitate; vinyl or acrylic crosslinking coagents, such as ethoxylated bisphenol A dimethacrylate; trimethylolpropane triacrylate ("TMPTA"), trimethylolpropane trimethylacrylate ("TMPTMA"), 1,6-hexanediol diacrylate, pentaerythritol tetraacrylate, dipentaerythritol pentaacrylate, tris (2-hydroxyethyl) isocyanurate triacrylate, and propoxylated glyceryl triacrylate; vinyl-containing crosslinking coagents, such as α-methyl styrene dimer ("AMSD"); polybutadiene having a high 1,2-vinyl content, and trivinyl cyclohexane ("TVCH"); and other crosslinking coagents as described in U.S. Pat. Nos. 5,346,961 and 4,018,852. Still other crosslinking coagents may have at least one N,N-diallylamide functional group such as is disclosed in U.S. Pat. No. 10,941,278 B2 to Cai et al. Preferably, the crosslinking coagent is TAIC. Additional examples of crosslinking coagents are described in U.S. Pat. No. 6,277,925 (e.g., allyl 2-allyl-phenyl ether, and the like) and USUS6143822 (e.g., 1,1-diphenylethylene, which may be unsubstituted or substituted).

The crosslinkable compound composition in accordance with the present invention can comprise the one or more crosslinking coagents in an amount ranging from 0.5 to 5 wt. %, or, from 0.7 to 3.5 wt. %, or, from 1.0 to 3 wt. %, or, from 1 to 2.5 wt. %, based on the total weight of the crosslinkable compound composition.

The crosslinking coagent can constitute at least 1 wt. %, at least 10 wt. %, at least 50 wt. %, at least 75 wt. %, or, up to 50 wt. %, or, up to 35 wt. %, based on the total weight of the combination of curative additives that are present in the crosslinkable compound composition.

The crosslinkable compound composition may also comprise a hindered amine stabilizer (HAS), sometimes called a hindered amine light stabilizer (HALS). The HAS is a compound that has a sterically hindered amino functional group and inhibits oxidative degradation. In some embodiments that HAS can also reduce acid-catalyzed degradation, these embodiments being wherein an acidic by-product is generated in situ during the method. The acidic by-product may be generated in situ by a reaction of an antioxidant with oxygen. Examples of suitable HAS are butanedioic acid dimethyl ester, polymer with 4-hydroxy-2,2,6,6-tetramethyl-1-piperidine-ethanol (CAS No. 65447-77-0, commercially LOWILITE 62). Other examples of HAS include: (i) 1,6-hexanediamine, N,N'-bis(2,2,6,6-tetramethyl-4-piperidinyl)-polymer with 2,4,6 trichloro-1,3,5triazine, reaction products with N-butyl-1-butanamine and N-butyl-2,2,6,6-tetramethyl-4-piperidinamine; (ii) poly[[6-[(1,1,3,3-tetramethylbutyl) amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]); and (iii) 1,6-hexaneidamine, N,N'-Bis(2,2,6,6-tetramethyl)-4-piperidinyl)-, polymers with 2,4-dichloro-6-(4-morpholinyl)-1,3,5-triazine. An alternative description of HAS (iii) is poly[(6-morpholino-s-triazine-2,4-diyl)[2,2,6,6-tetramethyl-4-piperidyl)imino]-hexamethylene[2,2,6,6-tetramethyl-4-piperidyl)imino]]. Other examples of HAS compounds can be found on pages 2 to 8 in Oxidation Inhibition in Organic Materials by J. Pospisil and P. P. Klemchuk, Volume II. The HAS can be used alone or in combinations of two or more. In some embodiments the HAS is N,N'-1,6-hexanediylbis(N-(2,2,6,6-tetramethyl-4-piperdinyl)-formamide, which is available as Uvinul 4050 from BASF.

The term "montmorillonite" includes naturally occurring or man-made phylosilicaes such as an inorganic montmorillonite and an oranomontmorillonite. The term "hydroperoxide" means any compound having at least one monovalent functional group of formula-OOH. The term N-nitrosodiarylamine means a compound of formula ON—N—$Ar_2$, wherein each Ar independently is an aryl group. The term "maleimide" (also referred to as "maleinimide") means an N-substituted 1H-pyrrole-2,5-dione. The term "imine compound" means a compound having a discrete carbon-nitrogen double bond. The term "hydroquinone" means 1,4-benzenediol and substituted 1,4-benzenediols, wherein at least one of the six hydrogen atoms of 1,4-benzenediol is replaced by a different atom, such as a halogen atom, or by a functional group such as a hydrocarbyl group, an organoheteryl group, hydroxyl, amino, thiol, or the like.

Various versions of melt mixing equipment are depicted in FIGS. 1, 2, 3 and 4 in accordance with the present invention.

FIG. 1 depicts methods and apparatuses in accordance with the present invention for making conductor or cable insulation compositions. A melt compounding line (2) comprises, moving left to right from upstream to downstream, a melt compounding device (4), in this case a twin-screw extruder, a melt pump (6), a melt screen (8) and a pelletizing die (10). Melt compounding device (4) melts and mixes the base thermoplastic polyolefin (ethylene polymer) feed (12), including any antioxidant additives, and, optionally including the combination of curative additives. Melt pump (6) helps build pressure upstream of the melt screen (8) which itself promotes the distribution of curative additives and improves the cleanliness of the crosslinkable compound product. Pelletizing die (10) pelletizes the formulation into a ready to use form. Melt compounding device (4) can be a twin-screw extruder, a batch mixer (Banbury mixer), a counter-rotating twin-rotor mixer (e.g., Farrel, FCM), or a single-screw extruder. Along melt compounding line (2), curative additives can be injected at any injection site (14), including: i) into melt compounding device (4) at or above a distributive mixing section (not shown), ii) the transition between melt compounding device (4) and melt pump (6), or iii) into melt pump (6) directly, or a combination thereof. Multiple injection sites (14), each including part of the combination of curative additives could be used to inject the desired total amount of curative additive.

Figure 2:
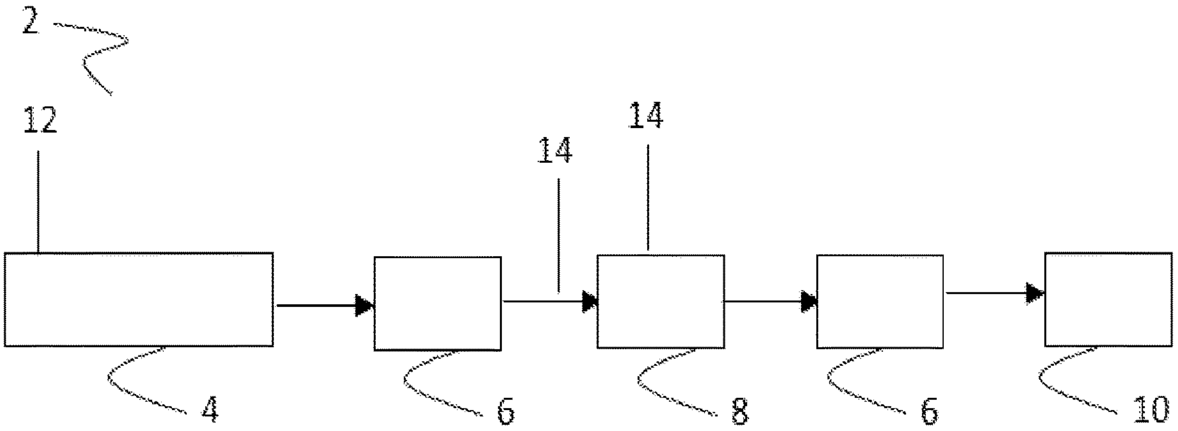
FIG. 2 depicts an alternative example of a melt compounding line (2) in accordance with the present invention.

FIG. 2 depicts other methods and apparatuses in accordance with the present invention for making conductor or cable insulation compositions. A melt compounding line (2) comprises, moving left to right from upstream to downstream, a melt compounding device (4), in this case a twin-screw extruder, two melt pumps (6) straddling a melt screen (8) and a pelletizing die (10). Melt compounding device (4) melts and mixes the base thermoplastic polyolefin (ethylene polymer) feed (12), including antioxidant additives, and, optionally, also including the combination of curative additives. The upstream (left hand) melt pump (6) helps build pressure upstream of the melt screen (8) which itself improves the cleanliness of the crosslinkable compound product. The downstream (right hand) melt pump (6) disperses the curative additives into the intermediate compound. Pelletizing die (10) pelletizes the formulation into a ready to use form. Melt compounding device (4) can be a co-rotating intermeshing twin-screw extruder, internal batch mixer (Banbury mixer), a counter-rotating twin-screw compounding mixer (e.g., Farrel, FCM), or a single-screw extruder. The curative additives can be injected into one or more injection sites (14), including i) the transition line between the melt screen (8) and downstream melt pump (6), or ii) directly into downstream melt pump (6). Both injection sites (14) may be used so that multiple injectors (not shown) may inject amounts that add up to the desired amount of curative additives.

Figure 3:
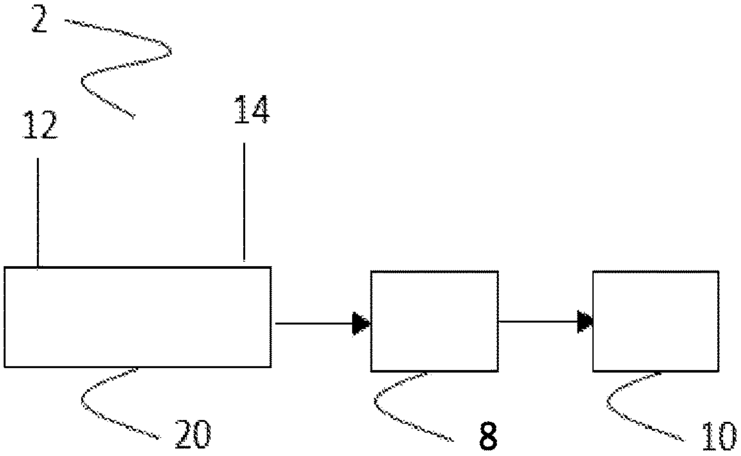
FIG. 3 depicts a melt compounding line (2) used to make the crosslinkable compounds in the inventive Examples of the present invention.

FIG. 3 shows the experimental melt compounding line (2) used in the some of the Examples and comprises, moving left to right from upstream to downstream, extruder (20), polymer feed site (12), injection site (14) for the combination of curative additives, melt screen (8) and pelletizing die (10).

In a preferred example of an extruder, a single screw or twin-screw extruder has a feeder, a melt screw section and downstream mixing section, such as a kneading block or gear mixer. The thermoplastic polyolefin polymer feed consisting of an LDPE and an antioxidant may be fed via the feeder at the upstream end of the extruder barrel; the curative additives can be injected at any of various injection sites upstream of the downstream mixing section.

EXAMPLES

The following examples illustrate the present invention. Unless otherwise indicated, all parts and percentages are by weight and all temperatures are in degrees Celsius (° C.) and all preparations and test procedures are carried out at ambient conditions of room temperature (23° C.) and pressure (1 atm). In the examples and Tables 1, 2, 3 and 4 that follow, the following abbreviations were used: DCP: Dicumyl Peroxide; LDPE: Low Density Polyethylene; MDR: Moving Die Rheometer.

The following materials were used in the Examples that follow (unless otherwise indicated, all ingredients were used as received):

Antioxidant Blend A: a mixture of 61.6 wt % of distearyl thiodipropionate (DSTDP), 37.5 wt % of tris[(4-tert-butyl-3-hydroxy-2,6-dimethylphenyl) methyl)-1,3,5-triazine-2,4,6 trione (available as CYANOX 1790 antioxidant from Solvay Chemicals), and 0.9 wt % of N,N'-1,6-hexanediylbis(N-(2,2,6,6-tetramethyl-4-piperidinyl)-formamide (available as Uvinul 4050 from BASF).

Antioxidant Blend B: 50 wt % 3,5-bis(1,1dimethylethyl)-4-hydroxybenzenepropanoic acid 2,2 '-thiodiethanediyl ester (Irganox 1035) and 50 wt % DSTDP.

Antioxidant Blend C: 50 wt % of 4,4'-thiobis(2-t-butyl-5-methylphenol) (Lowinox TBM-6) and 50 wt % 3,4-dihydro-2,5,7,8-tetramethyl-2-(4,8,12-trimethyltridecyl)-2H-1-benzopyran-6-ol. (Irganox E-201).

Antioxidant Blend D: 50 wt % of pentaerythritol tetrakis (3-(3,5-bis(1,1-dimethylethyl)-4-hydroxyphenyl) propionate (Irganox 1010) and 50 wt % DSTDP.

Antioxidant 1: tris[(4-tert-butyl-3-hydroxy-2,6-dimethylphenyl) methyl)-1,3,5-triazine-2,4,6 trione (CYANOX 1790).

Hindered Amine Light Stabilizer 1: Poly-{6-[(1,1,3,3-tetramethylbutyl) amino-1,3,5-triazine-2,4-diyl][(2,2,6,6-tetramethyl-4-piperidyl) imino]-1,6-hexanediyl[(2,2,6,6-tetramethyl-4-piperidyl)imino)} (Chimassorb 944).

Low-density polyethylene Polymer 1 (LDPE1): A low density polyethylene (LDPE) was used as the base resin in making the compounds in the lab. It has a density of 0.92 g/cc and a melt index (MI) of 1.9 dg/min (measured with 2.16 kg load at 190° C.).

Dicumyl Peroxide: DI-CUP™ (DCP) initiator (Arkema, Paris, FR, a white to pale yellow granular solid (melting point 38° C., specific gravity 1.02 g/cm$^3$ at 25° C.).

Crosslinking Coagent 1: Triallyl isocyanurate (TAIC).

Crosslinking Coagent 2: A monocyclic tetra(alkenyl-or-ganosiloxane) having the chemical name 2,4,6,8-tetramethyl-2,4,6,8-tetravinyl-cyclotetrasiloxane ("[$^{Vi}$D] 4").

Crosslinking Coagent 3: allyl 2-allyl-phenyl ether.

Crosslinking Coagent 4: triallyl cyanurate (TAC).

Crosslinking Coagent 5: alpha-methyl styrene dimer (AMSD).

Inventive Examples 1 to 4 (IE1 to IE4): curative additives comprise 1 organic peroxide and 2 crosslinking coagents. The formulations in the following inventive Examples 1 to 4 were made by mixing the LDPE1 and the Antioxidant blend in the amounts indicated in a Banbury mixer and were pelletized (Gala pelletizing system, MAAG Group, Oberglatt, CH) to make intermediate compound in the form of pellets. In inventive Examples 1 to 4, the pellets of the intermediate compound were then melt compounded in a twin-screw extruder and compounding line having the configuration as shown in FIG. 3, and under the conditions shown in Table 2 (e.g., 145° C.), below to give a melt stream of the intermediate compound; and then a combination of the organic peroxide DCP and Crosslinking Coagent 1 (TAIC) and Crosslinking Coagent 2 ([$^{Vi}$D]$_4$) were injected into the melt stream of the intermediate compound in the twin-screw extruder under the conditions shown in Table 2 (e.g., 145° C.) to make inventive crosslinkable compound compositions of Inventive Examples 1 to 4 (IE1 to IE4). In the compounding line, the melt screen comprised a screen pack (20/150/60/20).

The Examples shown in Table 3, below, use the same composition as listed in Table 1, below. In the following Inventive Example 1, the indicated parameter for each formulation was measured at the indicated time interval, starting immediately after the formulated product was made.

Soaking: In contrast to the inventive method, a widely used comparative method of adding an organic peroxide and a coagent into a thermoplastic polyolefin comprises soaking a liquid form of the organic peroxide and a liquid form of the coagent into warmed pellets of the thermoplastic polyolefin. In four non-inventive experiments, intermediate compound pellets were heated in an oven at 70° C. for at least 4 hours and then were placed in a wide-mouth, 1000 mL glass jar. DCP and either Crosslinking Coagent 1 (TAIC) or Crosslinking Coagent 2 (Vinyl-D4), but not both coagents (in contrast both coagents were used in IE1 to IE4), were premixed proportionally and then transferred to the glass jar using a syringe. The jar was shaken well and then placed on a stoneware tumbler which was run at 30 rotations per minute (rpm) for 10 minutes. The resulting mixtures were put into a 70° C. oven overnight to soak and make four non-inventive compound compositions. The non-inventive compound compositions were evaluated in the same way that the Inventive Examples 1 to 4 were evaluated. Data from the evaluations of the four non-inventive compound compositions are available upon request.

TABLE 1

Insulation Formulation of Inventive Example 1 (IE1)

| Components | Function | Amount (wt %) |
|---|---|---|
| Low-density polyethylene Polymer LDPE1 | Base LDPE resin (0.920, 2.0 MI) | 98.20 |
| Antioxidant Blend | Antioxidant | 0.15 |
| Crosslinking Coagent 1: TAIC | Crosslinker | 0.30 |
| Crosslinking Coagent 2: Vinyl-D4 | crosslinking coagent | 0.85 |
| Dicumyl Peroxide | Free radical initiator | 0.50 |
| Total | | 100 |

TABLE 2

Continuous Process Conditions

| Total Rate | Feed Rate of melt stream of intermediate compound | Injection Rate of curative additives | Screw speed | Hand-held thermocouple Melt Temp | Calculated Residence time of Curative Additives |
|---|---|---|---|---|---|
| Kg/hr (lb/hr) | Kg/hr (lb/hr) | g/min | rpm | ° C. | Seconds |
| 20.4 (45.00) | 20.1 (44.26) | 5.61 | 200 | 145 | Less than 25 seconds |

(Wabash MPI, Wabash, IN), with quench cooling capability. The plaques were then subject to the indicated testing. Curing for the hot creep test comprised melting pellets at 120° C. in compression molds WABASH™ GENESIS™ Steam Press; the dimension of the mold is 203 mm by 203 mm (8 inch by 8 inch) by 1.3 mm (50 mil) under a low pressure of 3.5 MPa (500 psi) for 3 minutes, and then compressing at the same temperature under a high pressure of 17 MPa (2500 psi) for another 3 minutes; opening the molds, removing the plaque from the mold and cutting it into four similar size pieces. In the test, the four pieces were then rearranged, put back into the mold, melted at 120° C. under a low pressure of 3.5 MPa (500 psi) for 3 minutes and compressed at the same temperature under a high pressure of 17 MPa (2500 psi) for another 3 minutes; then the temperature of the press increased to 182° C. and held for 12 minutes to cure the samples under the high pressure. After curing, the molds were cooled down to room temperature at 15° C./minutes under the high pressure.

Uncured Plaque Preparation: The pellets after soaking were pressed using the Wabash™ GENESIS™ Steam Press Test Methods: The following test methods were used in the various Examples that follow. Tables 3 and 4, below, provide the results of the test methods.

Stability Testing: In Inventive Example 1 of Table 3, below, each of Inventive Example 1-1, 1-2, 1-3, and 1-4 (IE1-1 to IE1-4) comprise one and the same formulation sampled over time. Samples of each formulation were collected under the same processing conditions and collected at different time intervals after starting the injecting of the curative additives into the melt stream of the intermediate compound according to the present invention, and tested to demonstrate product and process stability as shown by consistency of product properties produced over a long continuous melt compounding run. A long continuous melt compounding run lasts 2 to 4 hours, typically 2 to 3 hours. Sample collection time intervals were: For Inventive Example 1-1, sample taken about 15 min after starting the injecting of the curative additives were added at the indicated rate; for Inventive Example 1-2, sample taken at the end of $1^{st}$ hour; for Inventive Example 1-3, sample taken at the end of 2nd hour; and, for Inventive Example 1-4, sample taken at the end of $3^{rd}$ hour.

Plaques of crosslinkable compounds for testing in the Examples that follow were made in the following manner:

Cured Plaque Preparation: In the various Inventive Examples as indicated, the pellets were pressed and cured using a WABASH™ GENESIS™ Steam Press, with quench cooling capability. (For comparative compound compositions the pellets after soaking were pressed and cured under pressure using a WABASH™ GENESIS™ Steam Press with quench cooling capability. For MDR testing, the pellets were first melted at 120° C. under a low pressure of 3.5 MPa (500 psi) for 3 minutes and compressed at the same temperature under a high pressure of 17 MPa (2500 psi) for another 3 minutes. The molds were cooled down to room temperature at 15° C./minutes under the high pressure to form the uncured plaque.

Hot Creep: Hot creep measures the cure performance or extent of crosslinking of a crosslinkable compound; it can also indicate the extent to which a compound has not yet been crosslinked. Hot creep refers to elongation deformation under load, of a cured specimen of a given crosslinkable compound and is measured in accordance with ICEA T-28-562. The hot creep test is performed at 200° C. with a 20 $N/cm^2$ weight attached to the lower end of a 1.3 mm (50 mil) dog bone sample cut from a cured plaque with a die cutter in accordance with ASTM D412 type D and marked with two benchmark lines, each line at a distance of 25.4 mm in the middle of the sample. The samples were put into a preheated oven at 200° C. with a weight equal to a force of 20 $N/cm^2$ attached to the bottom of each sample. After 15 minutes, the elongation (distance between benchmark lines) was measured and used to calculate the hot creep. The weights were removed from the samples. After 5 minutes in the oven, the samples were taken out and left at room temperature for 24 hours. The elongation (distance between benchmark lines) were measured again and this value was used to calculate the hot set. Three samples were tested and the averages of hot creep were reported. An acceptable Hot Creep result is 100% or lower. For Hot Creep, the lower % elongation, the more the material is crosslinked.

Moving Die Rheometer (MDR): A Moving Die Rheometer (MDR) enables measuring the cure properties of a crosslinkable compound. The instrument measures the torque response of the material under deformation. As the material undergoes crosslinking, the torque response increases and eventually reaches a maximum torque ("MH") after the peroxide has been reacted at the test conditions of time and temperature. The MH value indicates the crosslink level of a given compound and should high enough to produce a crosslinkable compound. MDR testing was performed in accordance with ASTM procedure D5289, "Standard Test 20 Method for Rubber-Property Vulcanization Using Rotorless Cure Meters", using an Alpha Technologies Rheometer, MDR model 2000 unit (Alpha Technologies, Hudson, OH), measuring under shear. For testing, 2.56 cm (1 inch) diameter circles were cut from the 1.905 mm (75 mil) (thickness) uncured plaques, and 2 of the 1.905 mm (75 mil) circles were stacked together. The stacked two 1.905 mm (75 mil) circles were tested at 182° C. for 12 minutes to obtain an MH and at 140° C. (typical extrusion melt temperature) for varying lengths of time to get ts1. Both tests were performed at 0.5 degrees arc oscillation. MH is reported as the torque value when the curve plateaus. Desirably, MH is higher than 2.26 dN-m or <2 lbf-in. right after processing and does not change over time. Scorch time or ts1, refers to an indicator of cure kinetics useful for assessing resistance to premature crosslinking (scorch). For scorch time measurements, the reported value is the time required for increase of 1 unit (inch-lbf) or 1.13 deciNewton-meter (dN-m) from a minimum torque ("ML"). An acceptable ts1 at 140° C. should be at least 51 min or higher. The longer ts1, the better. Following equivalent definitions, other scorch metrics can be used, such as ts0.5, ts2, ts5 etc.

TABLE 3

Stability and Test Results of Inventive Example 1 Sampled at Different Time Intervals -1, -2, -3, and -4, respectively.

| Tested Property | IE1-1 | IE1-2 | IE1-3 | IE1-4 |
|---|---|---|---|---|
| Example 1 sampling time (interval after starting the injecting of curative additives), hours | 0.25 | 1 | 2 | 3 |
| High torque MH at 182° C., Newton-meter (lbf-inch) | 0.262 (2.32) | 0.262 (2.32) | 0.266 (2.35) | 0.269 (2.38) |
| Low torque ML at 182° C., Newton-meter (lbf-inch) | 0.016 (0.14) | 0.016 (0.14) | 0.017 (0.15) | 0.017 (0.15) |
| Scorch time ts1 at 140° C. (minutes) | 62.07 | 68.49 | 72.17 | 70.14 |
| Hot creep at 200° C., % | 73.6 | 82.53 | 61.59 | 64.11 |

As shown in Table 3, above, the inventive crosslinkable compound composition of Inventive Example 1 closely matches a successful crosslinkable compound produced via a much longer, labor intensive soaking process; and, comparing Inventive Example 1-4 to Inventive Examples 1-1, 1-2 and 1-3, the crosslinkable compound composition remains consistent over the period of melt compounding run. These data, including the I10 melt index information, the delta between the Maximum Torque and Minimum torque and the long scorch time all indicate that the inventive methods can make the same product consistently during a long continuous melt compounding run and that the inventive crosslinkable compound compositions are still crosslinkable.

TABLE 4

Scorch and Cure Criteria

| Ingredients | IE2 | IE3 | IE4 |
|---|---|---|---|
| LDPE, 2MI | 98.15 | 98.35 | 98 |
| Antioxidant Blend | 0.15 | 0.15 | 0.15 |
| Crosslinking Coagent 1: TAIC | 0.2 | 0.4 | 0.4 |
| Crosslinking Coagent 2: Vinyl-D4 | 1 | 0.6 | 0.85 |
| Dicumyl Peroxide | 0.5 | 0.5 | 0.6 |
| Total | 100 | 100 | 100 |
| Test Methods | 2 | 3 | 4 |
| High torque MH at 182° C., Newton-meter (lbf-inch) | 0.244 (2.16) | 0.249 (2.2) | 0.295 (2.61) |
| Low torque ML at 182° C., Newton-meter (lbf-inch) | 0.016 (0.14) | 0.016 (0.14) | 0.017 (0.15) |
| Scorch time ts1 at 140° C. (minutes) | 71.97 | 72.1 | 52.04 |
| Hot creep at 200° C., % | 82% | 123% | 73% |

As shown in Tables 3 and 4, above, the inventive crosslinkable compound compositions of Inventive Examples 1 to 4 provide scorch resistant crosslinkable compound compositions having good product consistency and crosslinkability. As shown in the scorch time (ts1) test in Table 3 and Table 4, above, all of the inventive crosslinkable compound compositions exhibit good scorch times and hot creep results.

Prophetic Inventive Examples 5 to 12 (IE5 to IE12): replicate the procedure used for IE1 to IE4 except for the following changes: the formulations are as described in Table 6 below (the curative additives comprise 1 organic peroxide and 1 crosslinking coagent) and the processing conditions are described in Table 5 below. The processing conditions in Table 6 are the same as those in Table 2 above except the hand-held thermocouple melt temperature is 125° C. The crosslinkable compound compositions of IE5 to IE12 are then tested with MDR, and the predicted results are also shown in Table 6.

TABLE 5 prophetic Continuous Process Conditions for IE5 to IE12.

| Total Rate | Feed Rate of melt stream of inter-mediate compound | Injection Rate of curative additives | Screw speed | Hand-held thermo-couple Melt Temp | Calculated Residence time of Curative Additives |
|---|---|---|---|---|---|
| Kg/hr (lb/hr) | Kg/hr (lb/hr) | g/min | rpm | ° C. | Seconds |
| 20.4 (45.00) | 20.1 (44.26) | 5.6 | 200 | 125 | 25 to 50 |

TABLE 6

IE5-IE12 (prophetic).

| Ingredients | IE5 | IE6 | IE7 | IE8 | IE9 | IE10 | IE11 | IE12 |
|---|---|---|---|---|---|---|---|---|
| LDPE1, 2MI | 97.94 | 97.72 | 97.89 | 97.94 | 97.94 | 97.94 | 98.04 | 97.89 |
| Antioxidant Blend B | 0.36 | 0 | 0.36 | 0 | 0 | 0 | 0 | 0 |
| Antioxidant Blend C | 0 | 0.38 | 0 | 0 | 0 | 0 | 0 | 0 |
| Antioxidant Blend D | 0 | 0 | 0 | 0 | 0 | 0 | 0.36 | 0.36 |
| Antioxidant 1 (Cyanox 1790) | 0 | 0 | 0 | 0.18 | 0.18 | 0.18 | 0 | 0 |
| HALS1 | 0 | 0 | 0 | 0.18 | 0.18 | 0.18 | 0 | 0 |
| Crosslinking Coagent 3 (allyl 2-allyl-phenyl ether) | 0.20 | 0 | 0 | 0.20 | 0 | 0 | 0.20 | 0.35 |
| Crosslinking Coagent 4 (TAC) | 0 | 0.20 | 0 | 0 | 0 | 0 | 0 | 0 |
| Crosslinking Coagent 5 (AMSD) | 0 | 0 | 0.35 | 0 | 0.40 | 0.20 | 0 | 0 |
| Dicumyl Peroxide | 1.50 | 1.70 | 1.40 | 1.50 | 1.30 | 1.50 | 1.40 | 1.40 |
| Total | 100.00 | 100.00 | 100.00 | 100.00 | 100.00 | 100.00 | 100.00 | 100.00 |
| Predicted Max. torque MH at 182° C., Newton-meter (lbf-inch) | 2.8 | 3.2 | 2.7 | 3.0 | 2.0 | 2.8 | 2.8 | 2.5 |
| Predicted Min. torque ML at 182° C., Newton-meter (lbf-inch) | 0.19 | 0.18 | 0.19 | 0.19 | 0.19 | 0.19 | 0.21 | 0.20 |
| Predicted Scorch time ts1 at 140° C. (minutes) | 79 | 69 | 84 | 78 | 130 | 91 | 69 | 90 |

Table 6 summarizes predicted results. ML, MH, and TS1 are as defined elsewhere in the current patent application. An ML value below 0.3 N-m is indicative of a low viscosity after compounding and is a clear indication that the material is not crosslinked during compounding and coagent and peroxide injection and mixing. These predicted results indicate that direct injection of the curatives resulted in embodiments of the crosslinkable compound composition that are expected to have not undergone detectable amounts of crosslinking and are predictive of suitability of the crosslinkable compound composition for use in the inventive process.

The invention claimed is:

1. A high-temperature, low-scorch method of making a crosslinkable compound composition, the method comprising:

injecting a combination of curative additives comprising one or more organic peroxides and one or more crosslinking coagents into a melt of an intermediate compound comprising one or more thermoplastic polyolefin polymers and one or more antioxidants, but lacking the one or more curative additives, wherein the melt is at a temperature of 120.0° to 150.0° C.; and rapidly mixing the curative additives into the melt in less than 60 seconds to make the crosslinkable compound composition as a homogeneous mixture of the one or more thermoplastic polyolefin polymers, the antioxidants, and the curative additives.

2. The method of claim 1 wherein the crosslinkable compound composition has:

a scorch time (ts1) at 140° C. of at least 50 minutes, reported as the time required at 140° C. for an increase of 1 footpound-inch (lbf-in) or 1.13 deciNewton-meter (dN-m) from minimum torque ("ML"), as determined by moving die rheometer (MDR) testing in accordance with ASTM procedure D5289; and a maximum torque (MH) at 182° C. that is at least 1.92 deciNewton-meter (dN-m; equal to at least 1.70 lbf-in) higher than minimum torque (ML) at 182° C.; and MH at 182° C. is at least 2.09 dN-m (1.85 lbf-in), as determined by moving die rheometer (MDR) testing in accordance with ASTM procedure D5289.

3. The method of claim 1 further comprising cooling the crosslinkable compound composition to a temperature of 100° C. or lower in less than 5 minutes.

4. The method of claim 1 wherein the method is a high-temperature, low-scorch method of continuously making a crosslinkable compound composition using a melt compounding line comprising a melt compounding device and a processing system downstream thereof, wherein the melt compounding device has a preparation zone, an injection zone, and a mixing zone, wherein the preparation zone is configured for continuously preparing a melt stream of an intermediate compound and moving the melt stream into the injection zone, wherein the injection zone has a feed point for continuously receiving the melt stream of the intermediate compound and one or more injection points for continuously injecting additives into the melt stream of the intermediate compound in the injection zone; and wherein the mixing zone has one or more mixing elements configured for rapidly homogenizing in 60 seconds or less the injected additives into the melt stream of the intermediate compound; and wherein the mixing zone may be the same as, or downstream from, the injection zone, the method comprises:

(A) continuously feeding a melt stream of an intermediate compound at a temperature of from 120.0° to 150.0° C. via the feed point into the injection zone of the melt compounding device, the melt stream of the intermediate compound comprising a mixture of:

a melt of one or more thermoplastic polyolefin polymers, and one or more antioxidants, but lacking one or more curative additives selected from the group consisting of: organic peroxides and crosslinking coagents;

(B) continuously injecting a combination of curative additives comprising one or more organic peroxides and one or more crosslinking coagents via at least one of the one or more injection points into the melt stream of the intermediate compound in the injection zone of the melt compounding device;

(C) rapidly homogenizing in 60 seconds or less by melt compounding the melt stream of the intermediate compound and the injected combination of curative additives to make the crosslinkable compound composition; and (D) continuously discharging a stream of the crosslinkable compound composition from the melt compounding device to the processing system, wherein the combination of curative additives has a residence time in the melt compounding device of 60 seconds or less; and wherein the crosslinkable compound composition comprises:

the one or more thermoplastic polyolefin polymers;

the one or more antioxidants;

the one or more organic peroxides; and the one or more crosslinking coagents; and wherein the crosslinkable compound composition has:

a scorch time (ts1) at 140° C. of at least 50 minutes, reported as the time required at 140° C. for an increase of 1 footpound-inch (lbf-in) or 1.13 deciNewton-meter (dN-m) from minimum torque ("ML"), as determined by moving die rheometer (MDR) testing in accordance with ASTM procedure D5289; and a maximum torque (MH) at 182° C. that is at least 1.92 deciNewton-meter (dN-m; equal to at least 1.70 lbf-in) higher than minimum torque (ML) at 182° C. than ML at 182° C.; and MH at 182° C. is at least 2.09 dN-m (1.85 lbf-in), as determined by moving die rheometer (MDR) testing in accordance with ASTM procedure D5289.

5. The method as claimed in claim 4 comprising, after step (D), a processing step (E) (i) or step (E) (II): (E) (i) wherein the processing system comprises a cooling device and a pelletizing device, which may be the same as or different than the cooling device, and step (E) (i) comprises cooling and pelletizing the crosslinkable compound composition to make solid pellets thereof; or (E) (ii) wherein the processing system comprises an annular coater device and a curing device and step (E) (ii) comprises coating a conductor, with the crosslinkable compound composition to make a coated conductor, and curing the coating to make a cable comprising the conductor and an insulation layer at least partially surrounding the conductor, wherein the insulation layer comprises the crosslinked compound composition made therefrom and the insulation is in direct contact with the conductor or is in indirect contact via one or more intervening layers.

6. The method as claimed in claim 4 comprising, before the injecting step (B), preparing the melt stream of the intermediate compound by either melting pellets of the intermediate compound or melting pellets comprising the one or more thermoplastic polyolefin polymers but lacking at least one of the one or more antioxidants, and mixing the melted thermoplastic polyolefin with the at least one of the one or more antioxidants.

7. The method as claimed in claim 4, wherein prior to the step (B) continuously injecting the combination of curative additives, the method further comprises:

pumping the melt stream of the intermediate compound through a melt pump to make a pressurized melt stream; and then melt screening the pressurized melt stream of the intermediate compound through a first melt screen upstream of all of the one or more injection points for injecting the combination of curative additives into the melt stream of the intermediate compound;

wherein the melt pump and first melt screen are located upstream of all the injection points of the injection zone of the melt compounding device.

8. The method as claimed in claim 4, further comprising:

at a point upstream of any injection point adding a second thermoplastic polyolefin polymer to the melt stream of the intermediate compound; and melt compounding the second thermoplastic polyolefin polymer and the intermediate compound.

9. The method as claimed in claim 4, wherein the one or more injection points for the injecting the combination of curative additives into the melt stream of the intermediate compound comprises any one or more of the following injection points (i) to (ix):

(i) wherein the mixing zone of the melt compounding device has a distributive or kneading section and the one or more injection points is/are at the distributive mixing or the kneading section at a downstream end of the melt compounding device;

(ii) at an injection point downstream of the feed point of the injection zone downstream of feeding step (A);

(iii) wherein the melt compounding device comprises, sequentially, a second-melt screen and a separate melt pump and the one or more injection points is/are downstream of the second melt screen and upstream of the separate melt pump;

(iv) wherein the melt compounding device comprises, sequentially, a second-melt screen, a separate melt pump, and a second melt pump, and the one or more injection points is/are located between the separate melt pump and the second melt pump; or, (v) a combination of injection points (i) and (ii);

(vi) a combination of injection points (i) and (iii);

(vii) a combination of injection points (i) and (iv);

(viii) a combination of any three of injection points (i) to (iv); or (ix) a combination of each of injection points (i) to (iv).

10. The method as claimed in claim 1, having any one of limitations (i)-(vii):

(i) wherein the one or more antioxidants comprises a mixture of two or more antioxidants; or wherein the one or more crosslinking coagents comprises an alkenyl group-containing monocyclic organosiloxane; or wherein the one or more antioxidants comprises a mixture of two or more antioxidants and the one or more crosslinking coagents comprises an alkenyl group-containing monocyclic organosiloxane;

(ii) wherein the one or more crosslinking coagents comprises an alkenyl group-containing monocyclic organosiloxane of formula (I):

$$[R^1,R^2SiO_{2/2}]_n \quad (I),$$

wherein subscript n is an integer greater than or equal to 3; each $R^1$ is independently a ($C_2$-$C_4$) alkenyl or a $H_2C{=}C(R^{1a})$—C(═O)—O—$(CH_2)_m$—, wherein $R^{1a}$ is H or methyl and subscript m is an integer from 1 to 4; and each $R^2$ is independently H, ($C_1$-$C_4$) alkyl, phenyl, or is the same as $R^1$;

(iii) wherein the one or more organic peroxides comprises dicumyl peroxide or a cumyl group-containing peroxide;

(iv) both limitations (i) and (ii);

(v) both limitations (i) and (iii);

(vi) both limitations (ii) and (iii);

(vii) each of limitations (i) to (iii).

11. The method as claimed in claim 1, wherein there is one thermoplastic polyolefin and the thermoplastic polyolefin polymers has a density as measured in accordance with ASTM D792 ranging from 0.87 to 0.94 g/cm$^3$, and a melt index ($I_2$) at 190° C./2.16 kg, of from 0.5 to 20 g/10 min, as determined in accordance with ASTM D1238, and reported in grams eluted per 10 minutes; or wherein the one or more thermoplastic polyolefin polymers comprise the one or more thermoplastic polyethylene polymers independently selected from the group consisting of: polyethylene homopolymers, ethylene/1-butene copolymers, ethylene/1-hexene copolymers, and ethylene/1-octene copolymers.

12. The method as claimed in claim 1 wherein the crosslinkable compound composition has a hot creep elongation at 200° C. of less than 130%, by testing in accordance with ICEA T-28-562a.

13. The method as claimed in claim 1 further comprising:

sampling the crosslinkable compound composition to give at least one sample thereof;

measuring, using the sample, the scorch time (ts1) at 140° C. of at least 50 minutes, reported as the time required at 140° C. for an increase of 1 footpound-inch (lbf-in) or 1.13 deciNewton-meter (dN-m) from minimum torque ("ML"), as determined by moving die rheometer (MDR) testing in accordance with ASTM procedure D5289; and measuring, using the sample, the maximum torque (MH) at 182° C. that is at least 1.92 deciNewton-meter (dN-m; equal to at least 1.70 lbf-in) higher than minimum torque (ML) at 182° C.; and MH at 182° C. is at least 2.09 dN-m (1.85 lbf-in), as determined by moving die rheometer (MDR) testing in accordance with ASTM procedure D5289.

14. The method as claimed in claim 1, further comprising:

shaping a melt of the crosslinkable compound composition to form a shaped crosslinkable compound composition; and curing the shaped crosslinkable compound composition to make a manufactured article.

* * * * *